US012658680B2

(12) United States Patent
Sylvester et al.

(10) Patent No.: US 12,658,680 B2
(45) Date of Patent: Jun. 16, 2026

(54) CABLE MANAGEMENT SYSTEM

(71) Applicant: Panduit Corp., Tinley Park, IL (US)

(72) Inventors: David J. Sylvester, Manhattan, IL (US); Rodney G. Rouleau, Manhattan, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 18/792,811

(22) Filed: Aug. 2, 2024

(65) Prior Publication Data

US 2024/0396312 A1     Nov. 28, 2024

Related U.S. Application Data

(63) Continuation-in-part of application No. 18/651,879, filed on May 1, 2024, now Pat. No. 12,261,426, which is a continuation of application No. 17/950,565, filed on Sep. 22, 2022, now Pat. No. 12,003,082.

(51) Int. Cl.
H02G 3/04     (2006.01)

(52) U.S. Cl.
CPC ................................. H02G 3/0456 (2013.01)

(58) Field of Classification Search
None
See application file for complete search history.

(56) References Cited

U.S. PATENT DOCUMENTS

| | | | |
|---|---|---|---|
| 1,017,388 A | 2/1912 | Dickson | |
| 1,698,531 A | 1/1929 | Brenizer | |
| 1,705,233 A | 3/1929 | Brenizer | |
| 2,318,859 A | * 5/1943 | Huguelet | ............... H02G 5/025 |
| | | | 174/70 B |
| 3,506,227 A | 4/1970 | Jenkins | |
| 4,136,423 A | 1/1979 | Sterling | |
| 4,151,533 A | 4/1979 | Vogt | |
| 4,799,641 A | * 1/1989 | Koreski | ............... F16L 3/2235 |
| | | | 248/68.1 |
| 4,840,333 A | 6/1989 | Nakayama | |

(Continued)

FOREIGN PATENT DOCUMENTS

| | | |
|---|---|---|
| AU | 2008255271 A1 | 7/2009 |
| CA | 3205926 A1 | 8/2022 |

(Continued)

OTHER PUBLICATIONS

Snake Tray's Cable Management for Solar Brochure; Sep. 2020 (12 pgs.).

*Primary Examiner* — Monica E Millner
(74) *Attorney, Agent, or Firm* — Freda Li; Christopher S. Clancy; James H. Williams

(57) ABSTRACT

A cable management system designed to support cables in solar applications. The cable management system includes a U-shaped bracket and at least one clamp half. The U-shaped bracket has a base with two arms with each arm including a securement slot. The clamp half has a top, a bottom, a front, a back, and sides with button pads extending from the sides. The clamp half is installed within the U-shaped bracket such that the button pads slide in the securement slots to position the clamp half in the U-shaped bracket. The clamp half separates and supports the cables installed in the U-shaped bracket.

20 Claims, 24 Drawing Sheets

(56)     References Cited

U.S. PATENT DOCUMENTS

| | | | | |
|---|---|---|---|---|
| 5,184,794 | A * | 2/1993 | Saito | F16L 3/13 |
| | | | | 248/74.1 |
| 5,188,319 | A * | 2/1993 | Hawash | B60R 16/0215 |
| | | | | 248/68.1 |
| 5,860,627 | A * | 1/1999 | Edwards | E04G 5/004 |
| | | | | 206/443 |
| 5,954,300 | A * | 9/1999 | Sturies | F16L 55/035 |
| | | | | 248/68.1 |
| 6,182,837 | B1 * | 2/2001 | Crabtree | E21B 19/15 |
| | | | | 206/443 |
| 6,261,037 | B1 * | 7/2001 | Richards | F16L 3/2235 |
| | | | | 410/36 |
| 6,530,545 | B2 | 3/2003 | Deciry et al. | |
| 6,561,466 | B1 * | 5/2003 | Myers | F16L 3/221 |
| | | | | 248/68.1 |
| 7,418,186 | B1 * | 8/2008 | Grubish | G02B 6/4477 |
| | | | | 385/137 |
| 7,734,139 | B2 * | 6/2010 | Rector, III | G02B 6/4459 |
| | | | | 385/136 |
| 8,074,945 | B2 * | 12/2011 | Schoenau | F16L 5/14 |
| | | | | 248/65 |
| 8,783,628 | B2 | 7/2014 | Jette | |
| 8,967,556 | B2 * | 3/2015 | Meyers | H02G 3/32 |
| | | | | 248/68.1 |
| 9,464,734 | B2 * | 10/2016 | Okura | H02G 3/22 |
| 9,722,405 | B2 | 8/2017 | Smith et al. | |
| 9,800,028 | B1 | 10/2017 | Smith et al. | |
| 9,996,121 | B2 * | 6/2018 | Mitsuishi | H02G 3/30 |
| 10,063,039 | B2 | 8/2018 | Smith et al. | |
| 10,225,947 | B2 | 3/2019 | Jette | |
| 10,666,029 | B2 | 5/2020 | Jette | |
| 10,670,170 | B2 | 6/2020 | Shea et al. | |
| 10,944,355 | B2 | 3/2021 | Jette | |
| 10,978,861 | B2 | 4/2021 | Smith et al. | |
| 11,205,890 | B2 | 12/2021 | Jette | |
| 11,271,519 | B2 | 3/2022 | Jette | |
| 11,349,291 | B2 | 5/2022 | Smith et al. | |
| 11,498,502 | B2 * | 11/2022 | Nozaki | F16L 3/13 |
| 11,692,648 | B2 | 7/2023 | Jette | |
| 11,817,817 | B2 | 11/2023 | Wedding et al. | |
| 11,959,571 | B2 | 4/2024 | Sylvester et al. | |
| 11,967,815 | B2 | 4/2024 | Worden | |
| 11,979,008 | B2 | 5/2024 | Rand et al. | |
| 12,003,082 | B2 | 6/2024 | Sylvester et al. | |
| 12,152,710 | B2 * | 11/2024 | Khan | G02B 6/06 |
| 2010/0207001 | A1 * | 8/2010 | Smith | F16L 55/035 |
| | | | | 248/230.4 |
| 2016/0058182 | A1 * | 3/2016 | Langston | A47B 47/0091 |
| | | | | 211/85.18 |
| 2020/0403390 | A1 | 12/2020 | Jette | |
| 2021/0194230 | A1 * | 6/2021 | Guyatt | H02G 3/263 |
| 2022/0038046 | A1 | 2/2022 | Wedding et al. | |
| 2022/0112969 | A1 | 4/2022 | Jette | |
| 2022/0190577 | A1 | 6/2022 | Worden | |
| 2022/0255300 | A1 | 8/2022 | Rand et al. | |
| 2024/0060577 | A1 | 2/2024 | Sylvester et al. | |

FOREIGN PATENT DOCUMENTS

| | | |
|---|---|---|
| CN | 102235552 A | 11/2011 |
| DE | 20201201825 U1 | 3/2019 |
| EP | 191480 A2 | 8/1986 |
| EP | 1215432 A2 | 6/2002 |
| EP | 3972066 A1 | 3/2022 |
| WO | 2021211788 A1 | 10/2021 |
| WO | 2024057217 A1 | 3/2024 |

* cited by examiner

CABLE MANAGEMENT SYSTEM

CROSS REFERENCE TO RELATED APPLICATION(S)

This application is a continuation in part of U.S. patent application Ser. No. 18/651,879 filed May 1, 2024, which is a continuation of U.S. patent application Ser. No. 17/950,565, filed Sep. 22, 2022, the entirety of which is hereby incorporated by reference herein.

FIELD OF THE INVENTION

The present invention relates to a cable management system, and more particularly to a messenger wire cable management system for solar applications.

BACKGROUND OF THE INVENTION

The use of solar panels for electrical power generation is a rapidly growing sustainable energy source. Each solar panel requires an electrical connection to collect the electric energy for use, storage, or connection to a power grid. The electrical energy produced by a single panel does not require large conductors but as the panels are connected to each other the conductor size must be increased to accommodate the amount of current being produced by the panels and carried by the conductor. Thus, large solar farms can produce a large amount of energy that requires large cables to carry the current. The cables are often suspended and routed with brackets hung from messenger wires. The number of cables in each bracket will vary but some installations might require 20 or more cables per bracket. If the cables are laying next to each other in the bracket, the current limit of the cables will be required to be derated. Free air space and derating of cables are defined in National Electric Code, NEC 100 and NEC 310, respectively. The free air space reduces the need to derate the current carrying limit of conductors. Thus, maintaining cable separation in the bracket will reduce or eliminate the derating factor for the cables. As a result, there is a need for an improved bracket that securely holds and separates the cables, that can be easily installed, and that includes minimum components.

SUMMARY OF THE INVENTION

A cable management system that supports cables in solar applications. The cable management system includes a U-shaped bracket and at least one clamp half positioned within the U-shaped bracket. The U-shaped bracket has a base with two arms with each arm including a securement slot. The clamp half has a top, a bottom, a front, a back, and sides with button pads extending from the sides. The button pads slide in the securement slots to position the clamp half within the U-shaped bracket. The clamp half separates and supports the cables installed in the U-shaped bracket.

DETAILED DESCRIPTION

Figure 1:
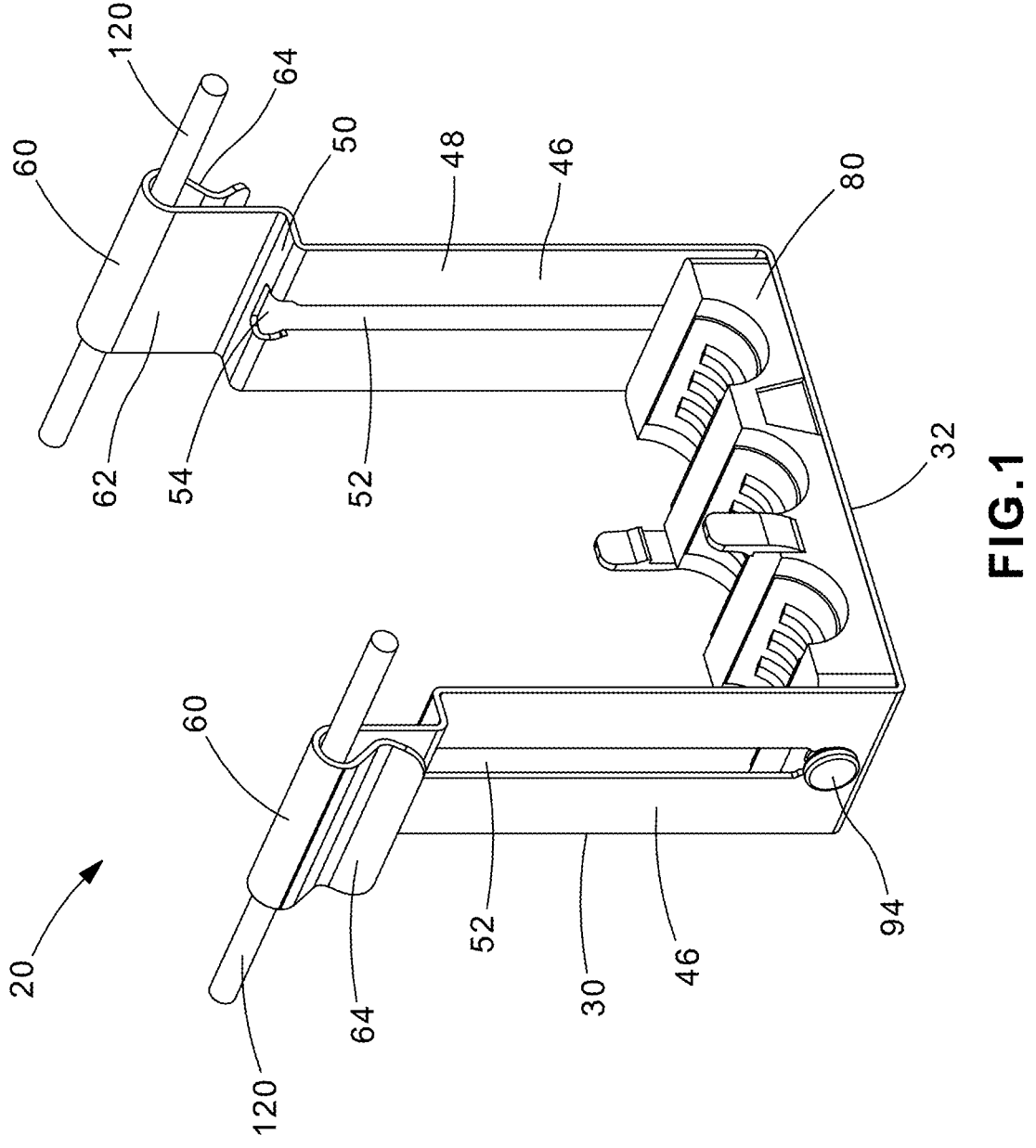
FIG. 1 is a perspective view of a partially assembled cable management system of the present invention.

The present invention is directed to a cable management system 20 for solar applications. The cable management system includes a U-shaped bracket 30 and a plurality of clamp halves 80 that form cable clamps (see FIGS. 5-6). The U-shaped bracket 30 provides a stable and secure platform for the polymer cable clamps. FIG. 1 illustrates the U-shaped bracket 30 with one clamp half 80 positioned therein.

Figure 2:
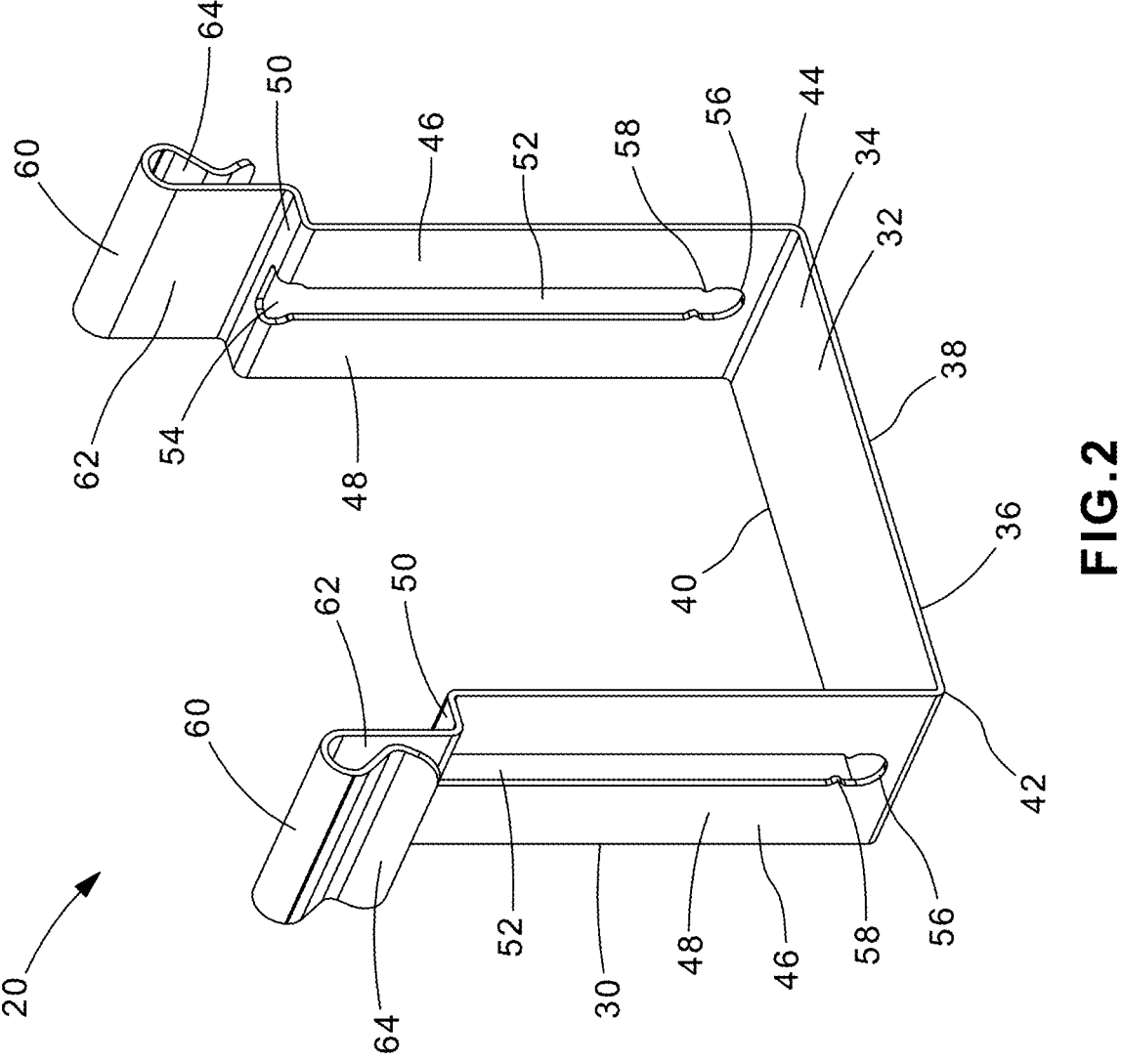
FIG. 2 is a perspective view of the U-shaped bracket of the cable management system of FIG. 1.

As illustrated in FIG. 2, the U-shaped bracket 30 includes a base 32 with a top 34, a bottom 36, a front 38, a back 40, a first side 42, and a second side 44. Arms 46 extend from the first side 42 and the second side 44 of the base 32. The arms 46 include a vertical member 48 that extends to a horizontal member 50. Each arm 46 includes a securement slot 52 located in the center of the arm 46. The securement slots 52 include an enlarged entrance end 54 located in the horizontal member 50. The entrance end 54 allows for loading of the clamp half 80 in the bracket 30 without manipulating the bracket 30. Each securement slot 52 extends from the entrance end 54 in the horizontal member 50, down the center of the vertical member 48, to a circular bottom 56 with locking tabs 58 in the vertical members 48 of each arm 46.

Messenger wire latches 60 are located at the distal end of the horizontal member 50 of the arms 46. The messenger wire latches 60 secure messenger wires 120 for the solar application. The messenger wire latches 60 include a vertical member 62 connected to a spring hook 64. The messenger wire latches 60 provide range taking capabilities when receiving various diameter messenger wires 120. The messenger wire latches 60 provide easy attachment and reduce the amount of part numbers required for the cable management system.

Figure 3:
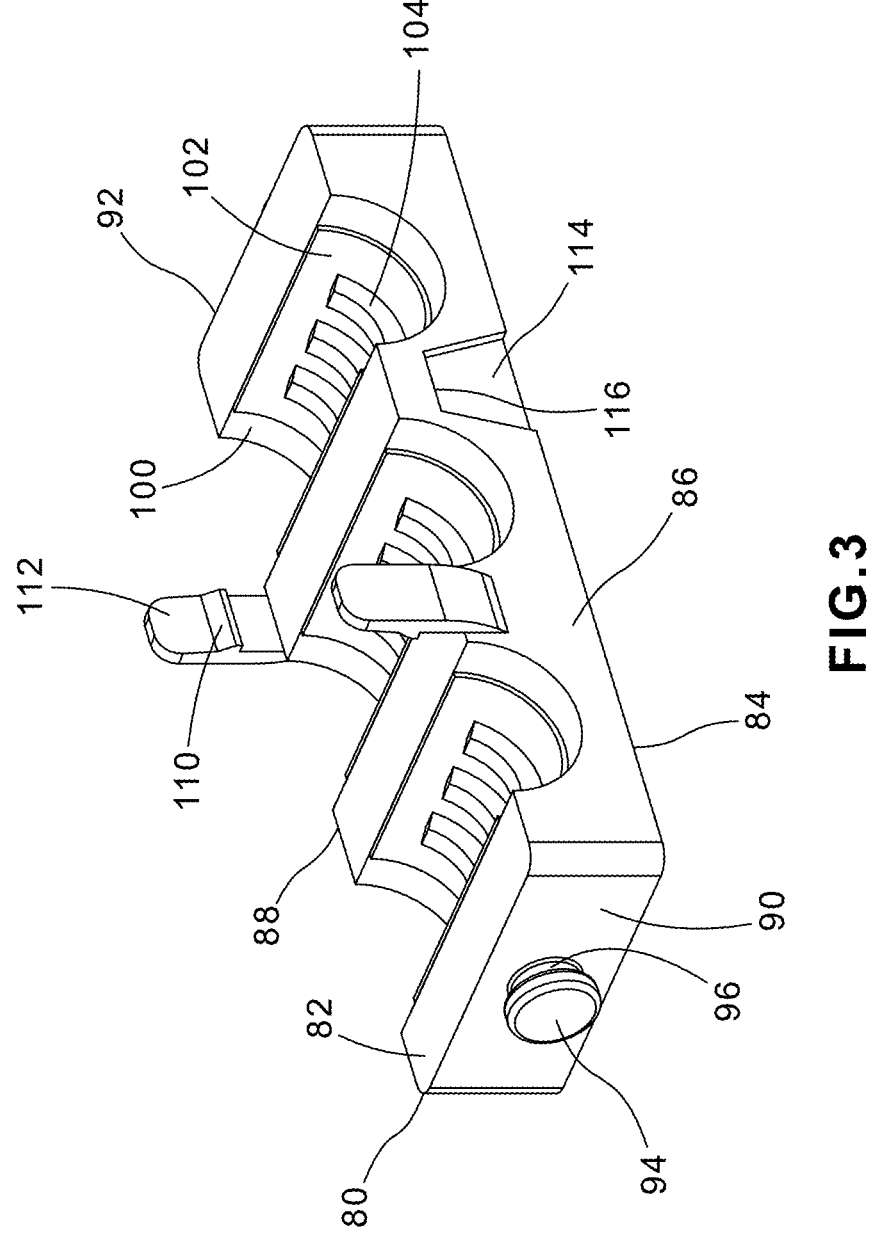
FIG. 3 is a perspective view of a clamp half of the cable management system of FIG. 1.

As illustrated in FIG. 3, the clamp half 80 includes a top 82, a bottom 84, a front 86, a back 88, a first side 90 and a second side 92. Each side 90, 92 of the clamp half 80 includes a button pad 94 that extends from a center of each side 90, 92 via a shaft 96.

The top 82 of the clamp half 80 includes a plurality of saddles 100. The saddles 100 are semi-circular and include a cushion insert 102. The cushion inserts 102 have flexible ribs 104 that enable the use of multiple cables or a single cable with different diameters to be positioned in each of the saddles 100 within a single clamp half 80. The flexible ribs 104 securely hold the various cable sizes while preventing the cables from being damaged. The cushion inserts 102 can be either a separate molded component this is inserted manually into the clamp half 80 or the cushion inserts 102 can be manufactured with the clamp half 80 by an over molding process.

Figure 5:
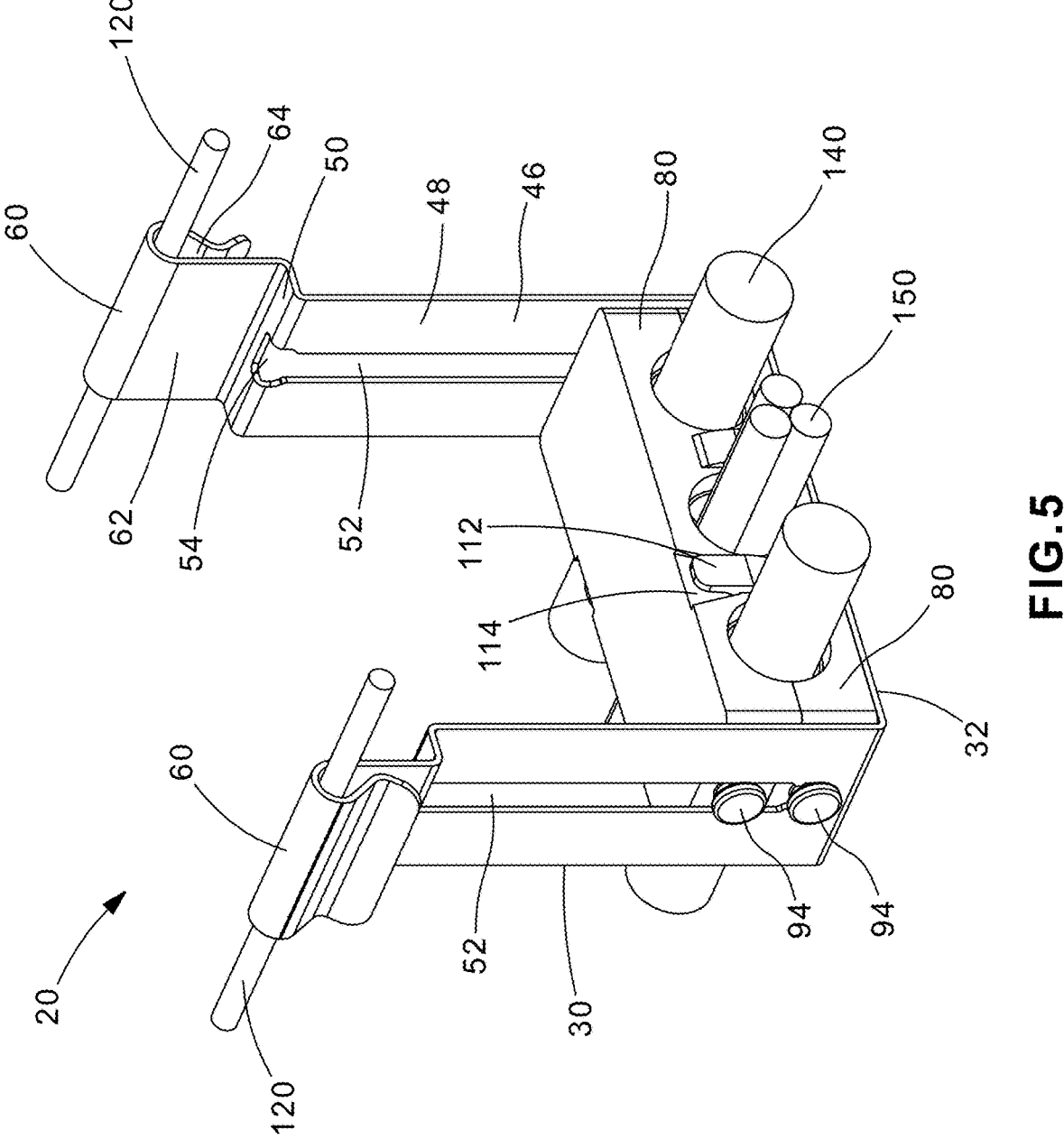
FIG. 5 is a perspective view of the cable management system of FIG. 4 with a top clamp half positioned in the U-shaped bracket and secured to the bottom clamp half to from a cable clamp.
Figure 6:
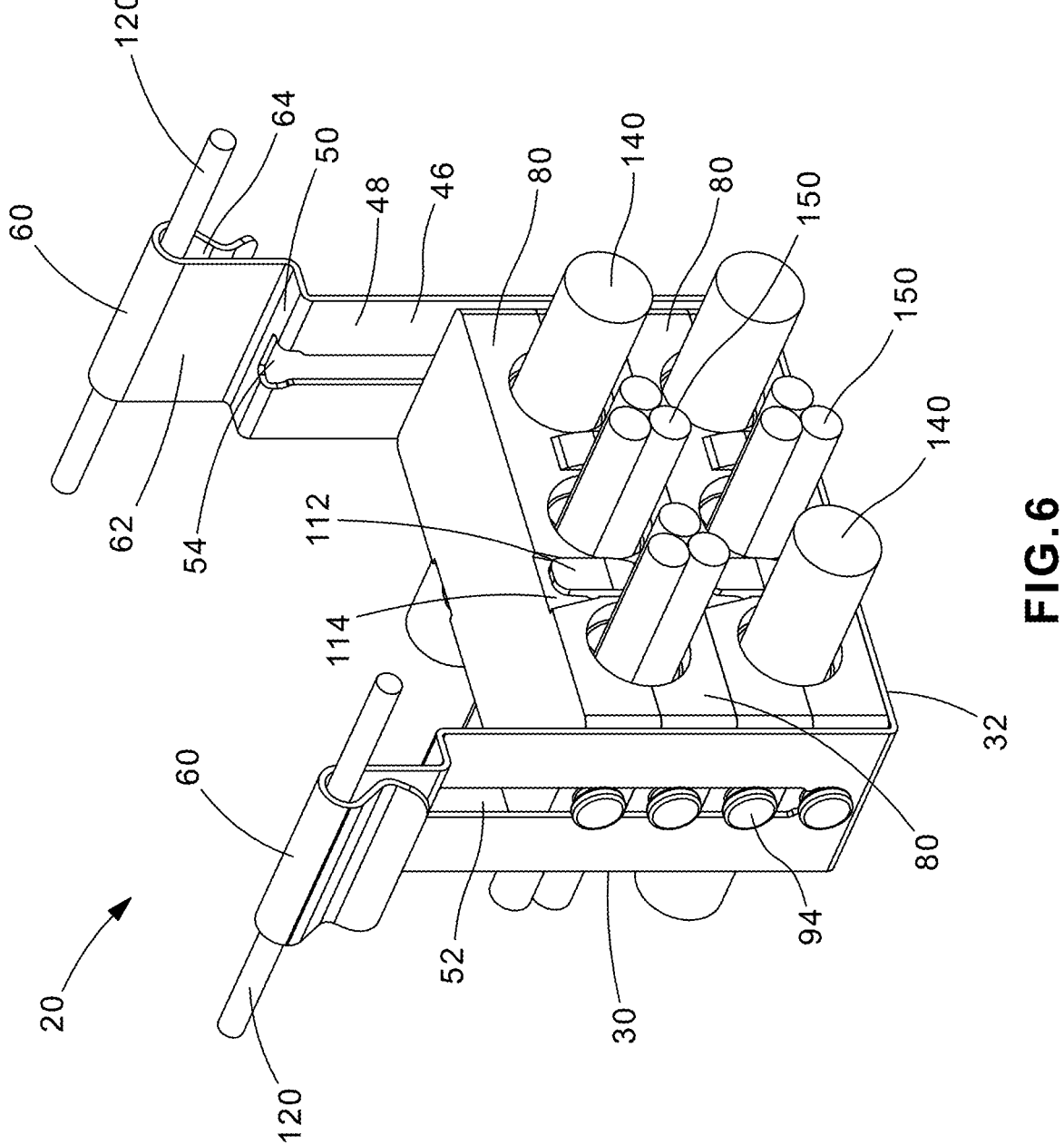
FIG. 6 is a perspective view of the cable management system of FIG. 5 with a second cable clamp and cables positioned within the bracket.

The front 86 and the back 88 of the clamp halves 80 include releasable latches 110 with thumb tabs 112. The front 86 and back 88 of the clamp halves 80 also include a notch 114 or opening with a ledge 116. The releasable latch 110 extending from the front 86 of the clamp half 80 is aligned with the notch 114 and ledge 116 in the back 88 of the clamp half 80 and the releasable latch 110 extending from the back 88 of the clamp half 80 is aligned with the notch 114 and ledge in the front 86 of the clamp half 80. As illustrated in FIGS. 5-6, two clamp halves 80 are snapped together via the releasable latch 110 engaging the ledge 116 defined by the notch 114 to create a cable clamp assembly. Once the two messenger wires 120 are installed for the solar application (not illustrated), the U-shaped bracket 30 is snapped onto the messenger wires 120. A clamp half 80 is inserted in the U-shaped bracket 30 with the bottom 84 of the clamp half 80 positioned to be placed on the base 32 of the U-shaped bracket 30 and the saddles 100 of the clamp half 80 facing upwards. The button pads 94 extending from the sides 90, 92 of the clamp half 80 are inserted in the entrance end 54 of the securement slots 52 of the U-shaped bracket 30. The clamp half 80 is slid towards the base 32 of the U-shaped bracket 30 via the button pads 94 in the securement slot 52. As illustrated in FIG. 1, the clamp half 80 is locked in place in the U-shaped bracket 30 once the button pads 94 pass the locking tabs 58 of the securement slot 52. The button pads 94 are positioned at the circular bottom 56 of the securement slot 52. The securement slot 52 also maintains the alignment of clamp halves 80 when multiple clamp halves are installed in the U-shaped bracket.

Figure 4:
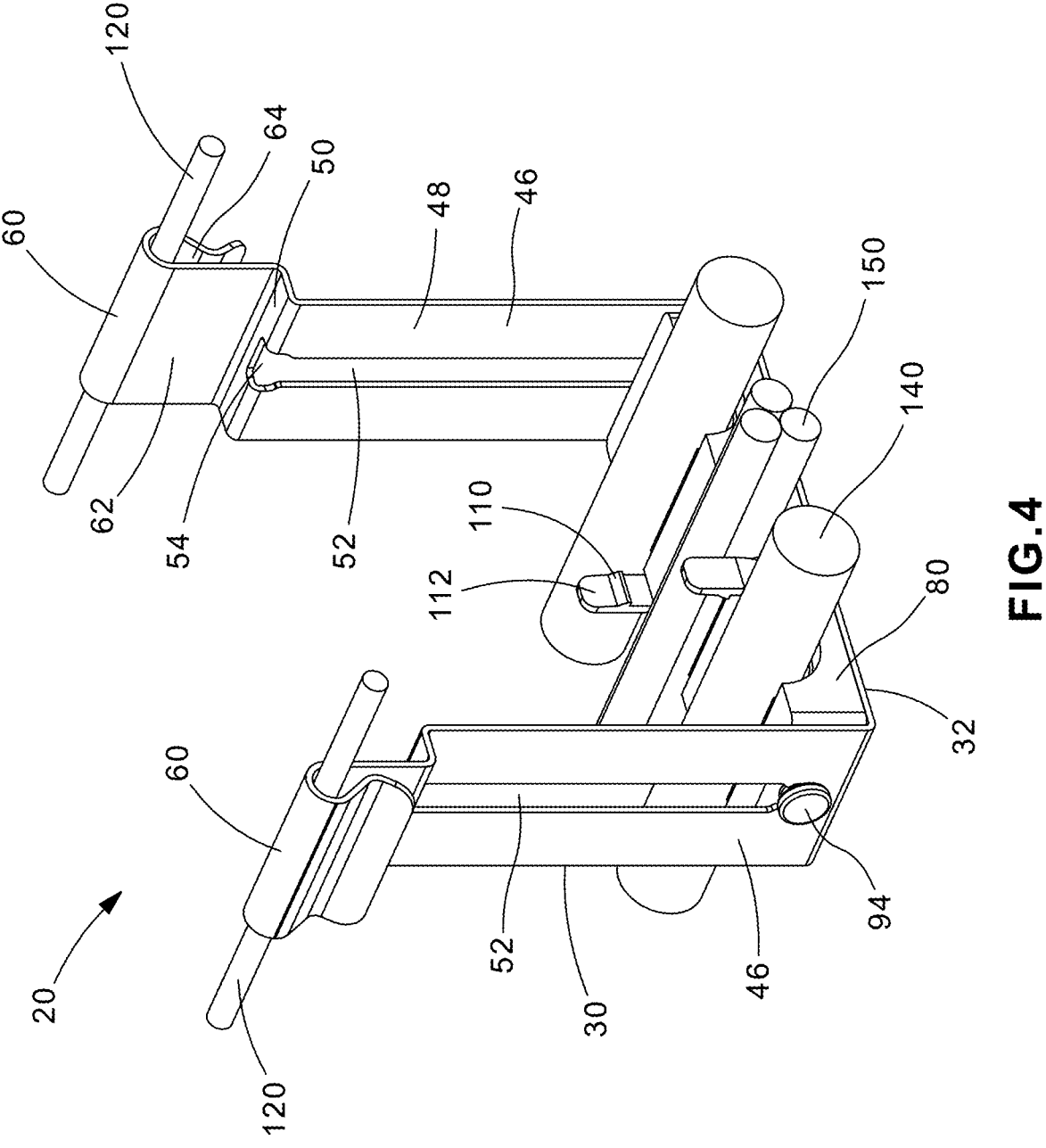
FIG. 4 is a perspective view of the partially assembled cable management system of FIG. 1 with a plurality of cables positioned on the clamp half.

As illustrated in FIG. 4, a first layer of cables 140, 150 is loaded onto the clamp half 80. Once the layer of cables 140, 150 has been loaded, a second clamp half 80 is installed in the U-shaped bracket 30. As illustrated in FIG. 5, the second or top clamp half 80 is installed with the saddles 100 facing downwards. The two clamp halves 80 are snapped together via the releasable latches 110 engaging the ledge 116 defined by notches 114 to create a cable clamp assembly. If cables need to be added or removed, the releasable latches 110 can be pulled open by using the thumb tab 112 for fast and easy removal. The installer can unlock the cable halves 80 by pushing the thumb tab 112 inward and pulling the cable clamp assembly apart.

Cable clamp assembly layers are added to the U-shaped bracket 30, as needed, using the same installation steps described above. For example, as illustrated in FIG. 6, a second cable clamp assembly with cables has been installed in the U-shaped bracket.

The cable management system of the present invention provides a bracket with securement slots that facilitate the ease of assembly and the loading of the clamp halves. The clamp halves of the present invention ensure cable separation that maintains cable free air space. The cable management system of the present invention provides an improved system with minimum components for supporting cables in solar applications.

FIGS. 7-24 illustrate an alternative cable management system 200 that routes and manages a variety of cable diameters and gauges. The cable management system 200 includes a U-shaped bracket 230 with messenger wire latches 260 (FIG. 8), a closure bracket 300 (FIGS. 9-10), and a plurality of cable clamp halves 380 (FIGS. 11-15).

Figure 8:
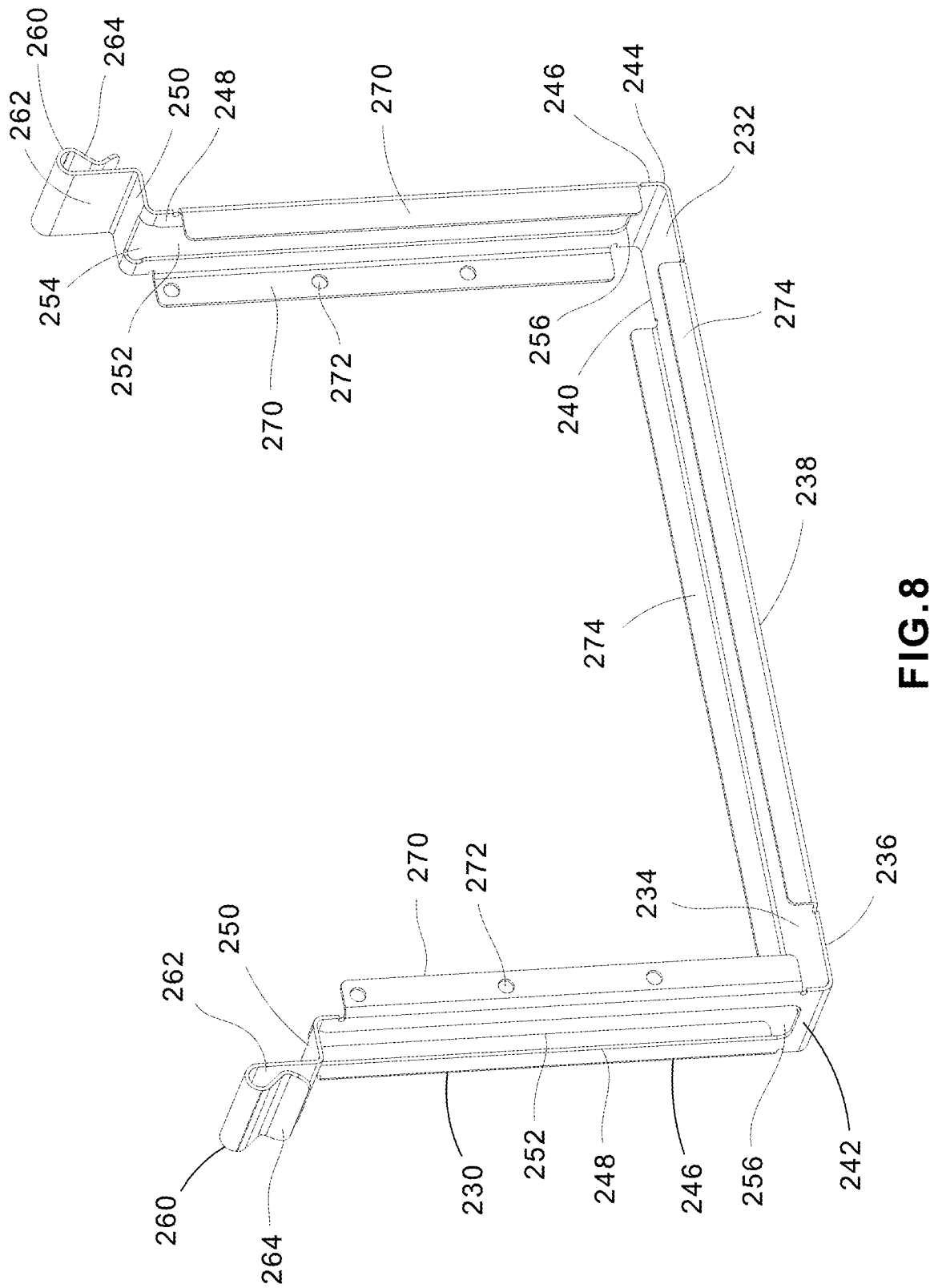
FIG. 8 is a perspective view of the U-shaped bracket of the cable management system of FIG. 7.

As illustrated in FIG. 8, the U-shaped bracket includes a base 232 with a top 234, a bottom 236, a front 238, a back 240, a first side 242, and a second side 244. Arms 246 extend from the first side 242 and the second side 244 of the base 232. The arms 246 include a vertical member 248 that extends to a horizontal member 250. Each arm 246 includes a slot 252 located in the center of the arm 246. The slots 252 include an enlarged entrance end 254 located in the horizontal member 250. The entrance end 254 allows for loading of the cable clamp halves 380 in the bracket 230 without manipulating the bracket 230. Each slot 252 extends from the entrance end 254 in the horizontal member 250, down the center of the vertical member 248, to a bottom 256 in the vertical member 248.

The arms 246 and the base 232 include gussets 270, 274, respectively, to provide strength and protection against natural forces or accidental damage. One gusset 270 extending from each arm includes closure bracket fastener holes 272. The gussets 270, 274 also cradle the cable clamp halves 380 keeping them contained within the U-shaped bracket 230.

Messenger wire latches 260 are located at the distal end of the horizontal member 250 of the arms 246. The messenger wire latches 260 secure messenger wires 120 for the solar application. The messenger wire latches 260 include a vertical member 262 connected to a spring hook 264. The messenger wire latches 260 provide range taking capabilities when receiving various diameter messenger wires 120. The messenger wire latches 260 provide easy attachment and reduce the amount of part numbers required for the cable management system.

Figure 7:
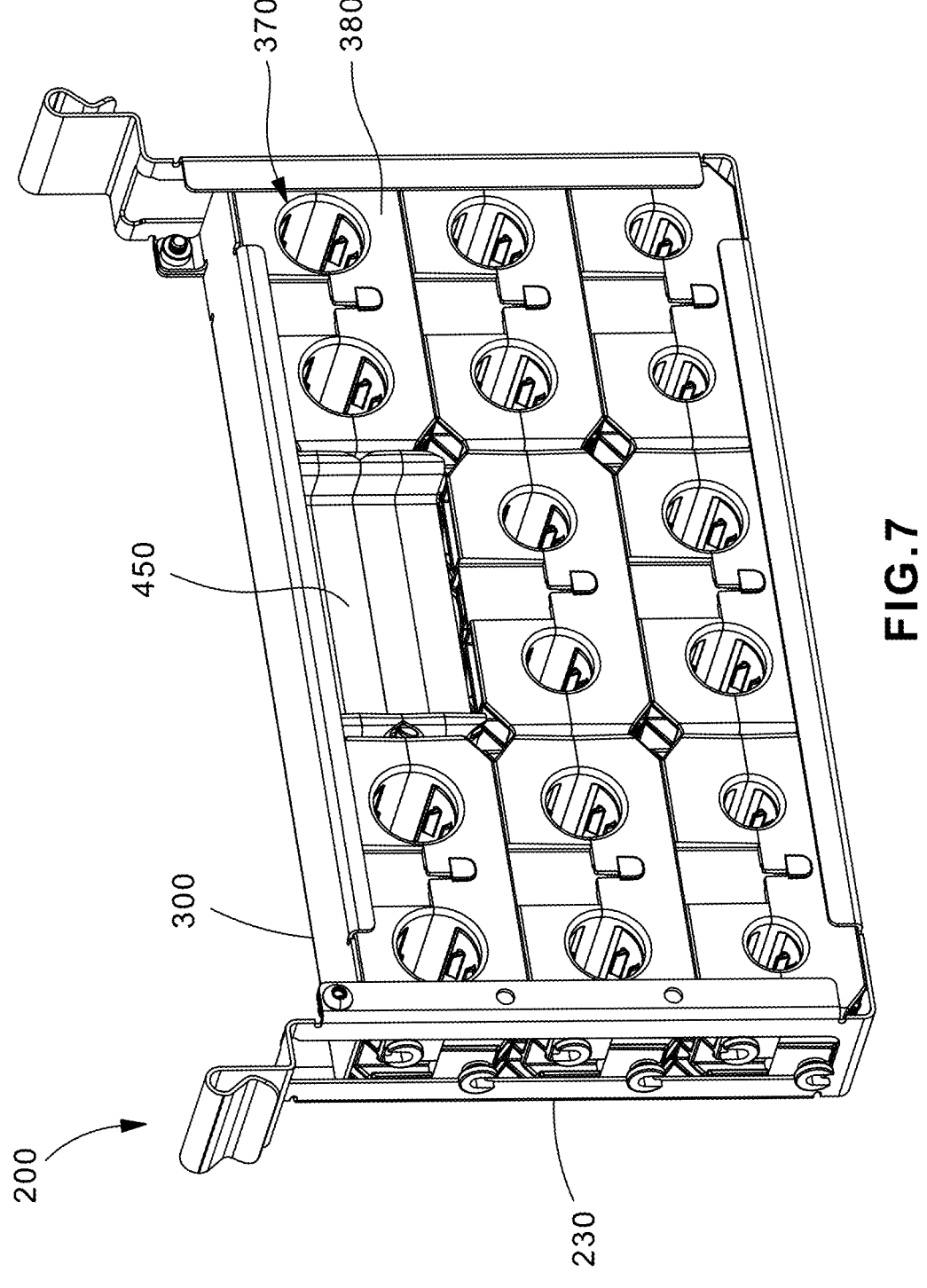
FIG. 7 is a perspective view of an alternative cable management system.
Figure 9:
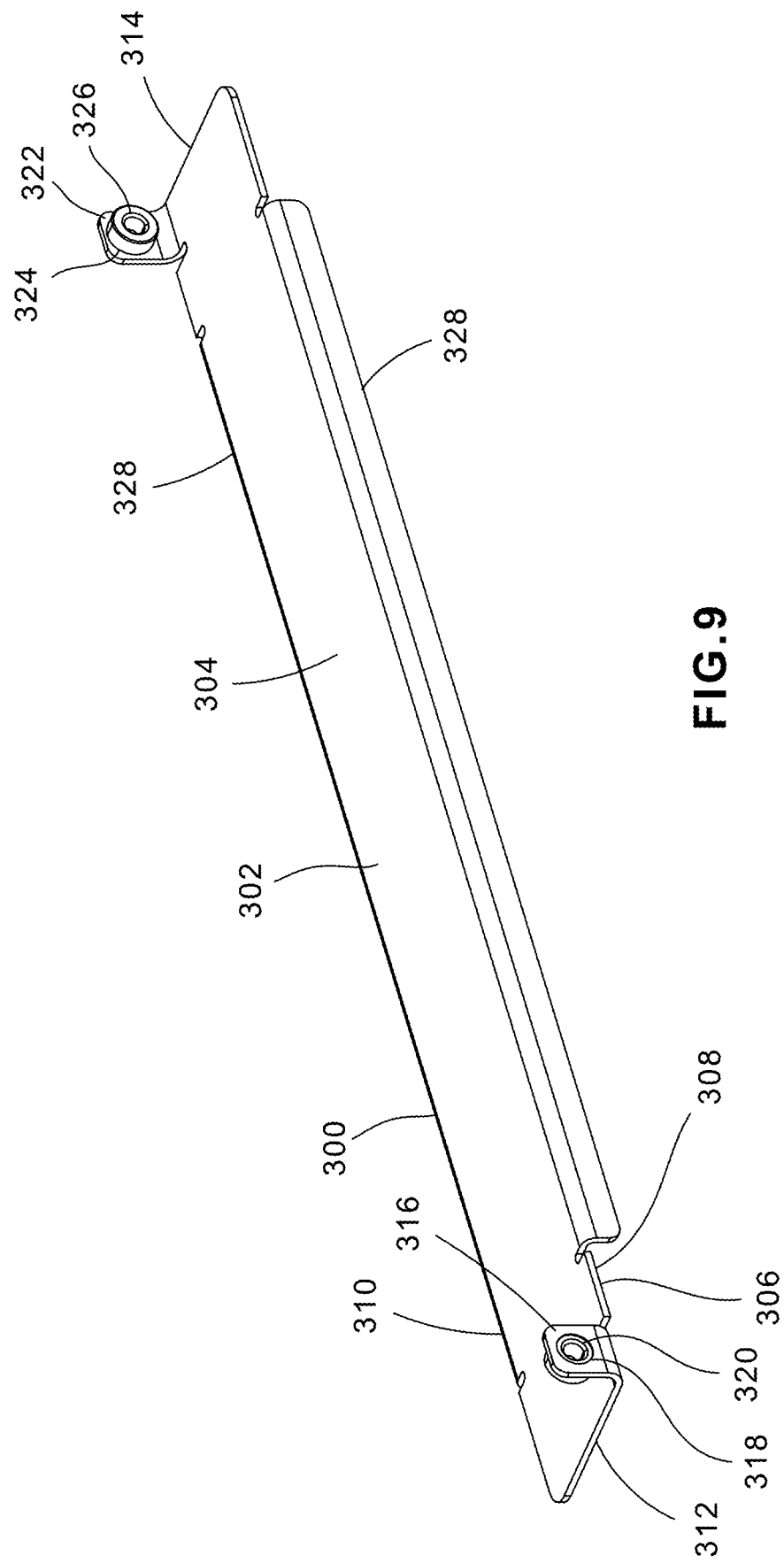
FIG. 9 is a perspective view of the closure bracket of the cable management system of FIG. 7.
Figure 10:
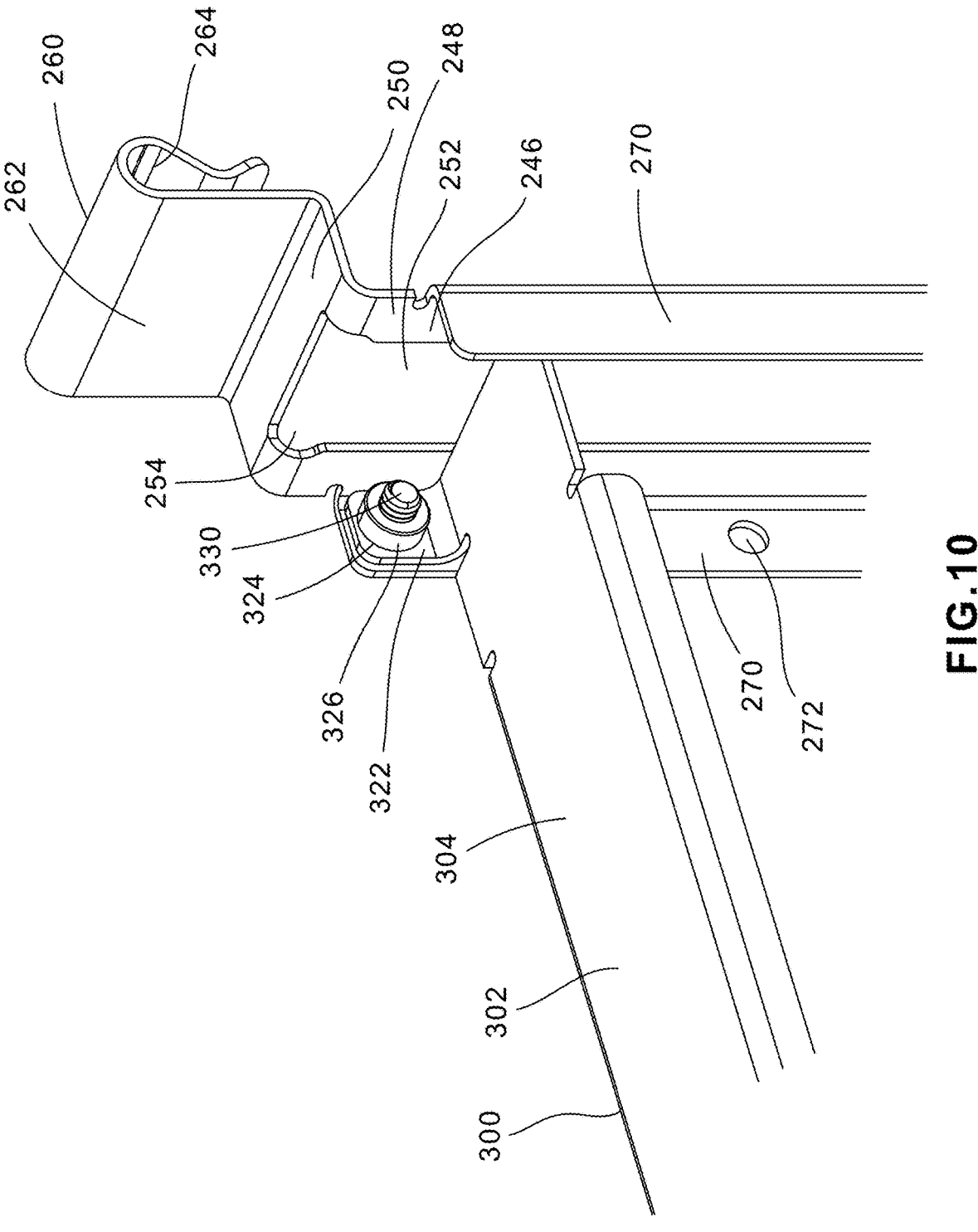
FIG. 10 is a perspective view of one end of the closure bracket secured to the U-shaped bracket of the cable management system of FIG. 7.
Figure 11:
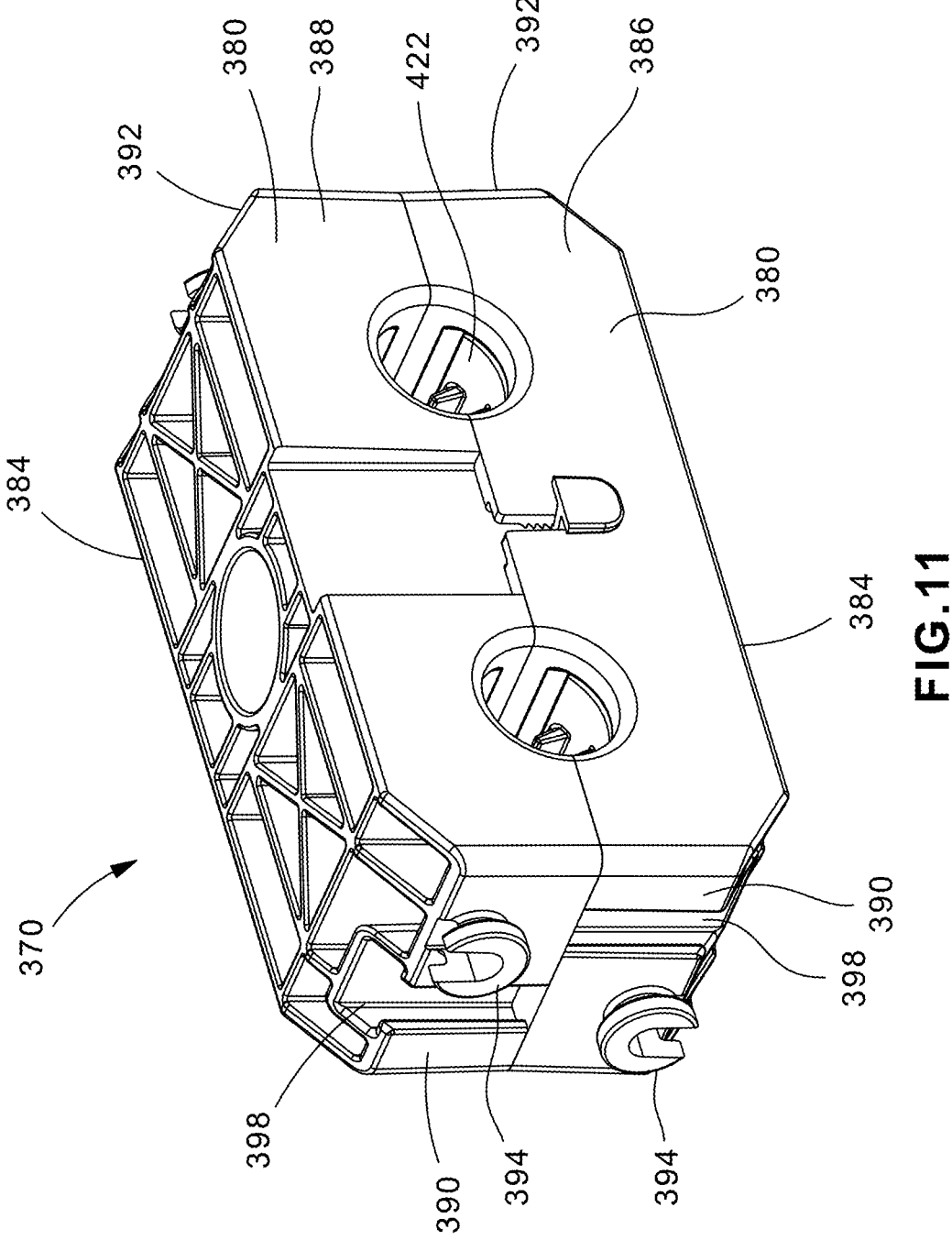
FIG. 11 is a perspective view of the cable clamp assembly installed in the U-shaped bracket of the cable management system of FIG. 7.

As illustrated in FIG. 7, a closure bracket 300 is installed in the U-shaped bracket 230 after the cable clamp halves 380 have been installed. As illustrated in FIGS. 7 and 9, the closure bracket 300 includes a flat member 302 that extends the length of the base 232 of the U-shaped bracket 230. The flat member 302 has a top 304, a bottom 306, a front 308, a back 310, a first side 312, and a second side 314. The closure bracket 300 includes a flange 316 extending from the front 308 and a flange 322 extending from the back 310. Each flange 316, 322 includes a hole 318, 324 with a PEM nut 320, 326 installed therein. The closure bracket 300 also includes two gussets 328 extending from the front 308 and the back 310 in a direction opposite of the flanges 316, 322. The gussets 328 provide additional strength to the U-shaped bracket. As illustrated in FIG. 10, the flanges 316, 322 of the closure bracket 300 are attached to the U-shaped bracket 230 with fasteners 330 via the PEM nuts 320, 326.

Figure 15:
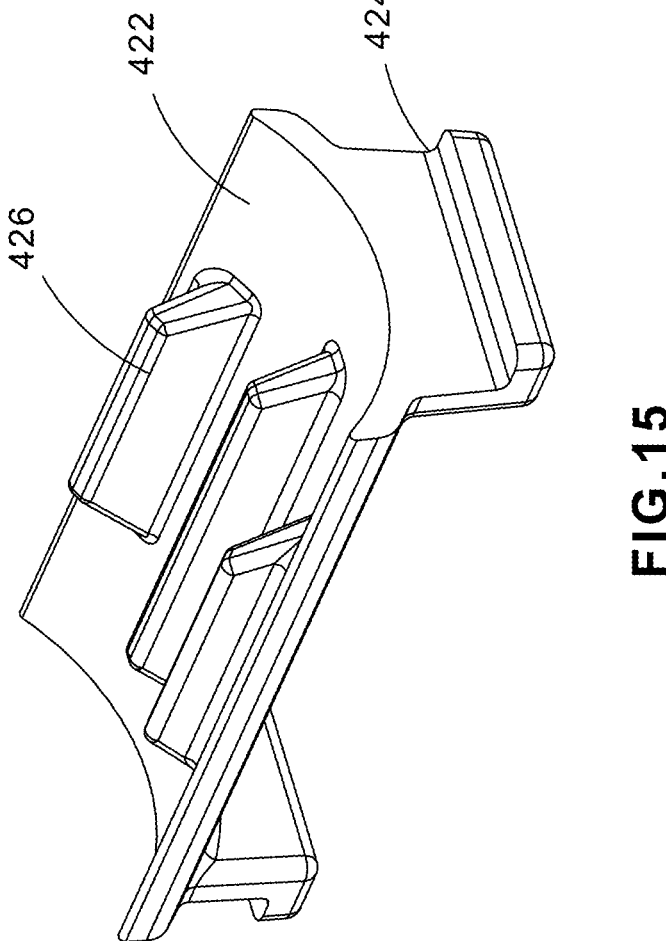
FIG. 15 is a perspective view of a cushion insert installed in the cable clamp assembly of FIG. 14.

FIGS. 11-14 illustrate the cable clamp halves 380 that form the cable clamp assembly 370. Each cable clamp assembly 370 includes two cable clamp halves 380 and four range taking cushion inserts 422 (FIG. 15). Each cable clamp assembly 370 is designed to house two cables.

Figure 12:
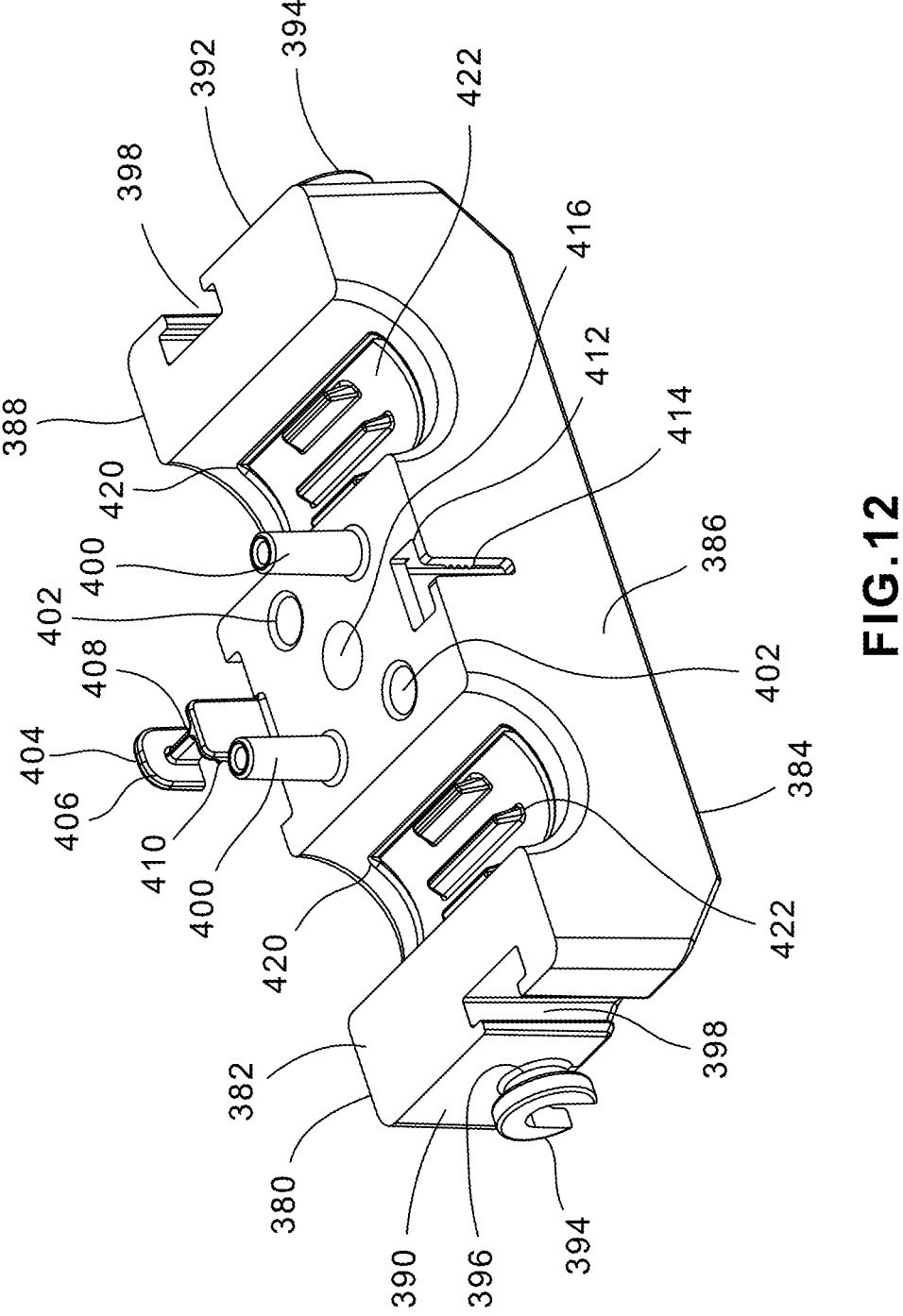
FIG. 12 is a top perspective view of a bottom cable clamp half of the cable clamp assembly of FIG. 11.
Figure 13:
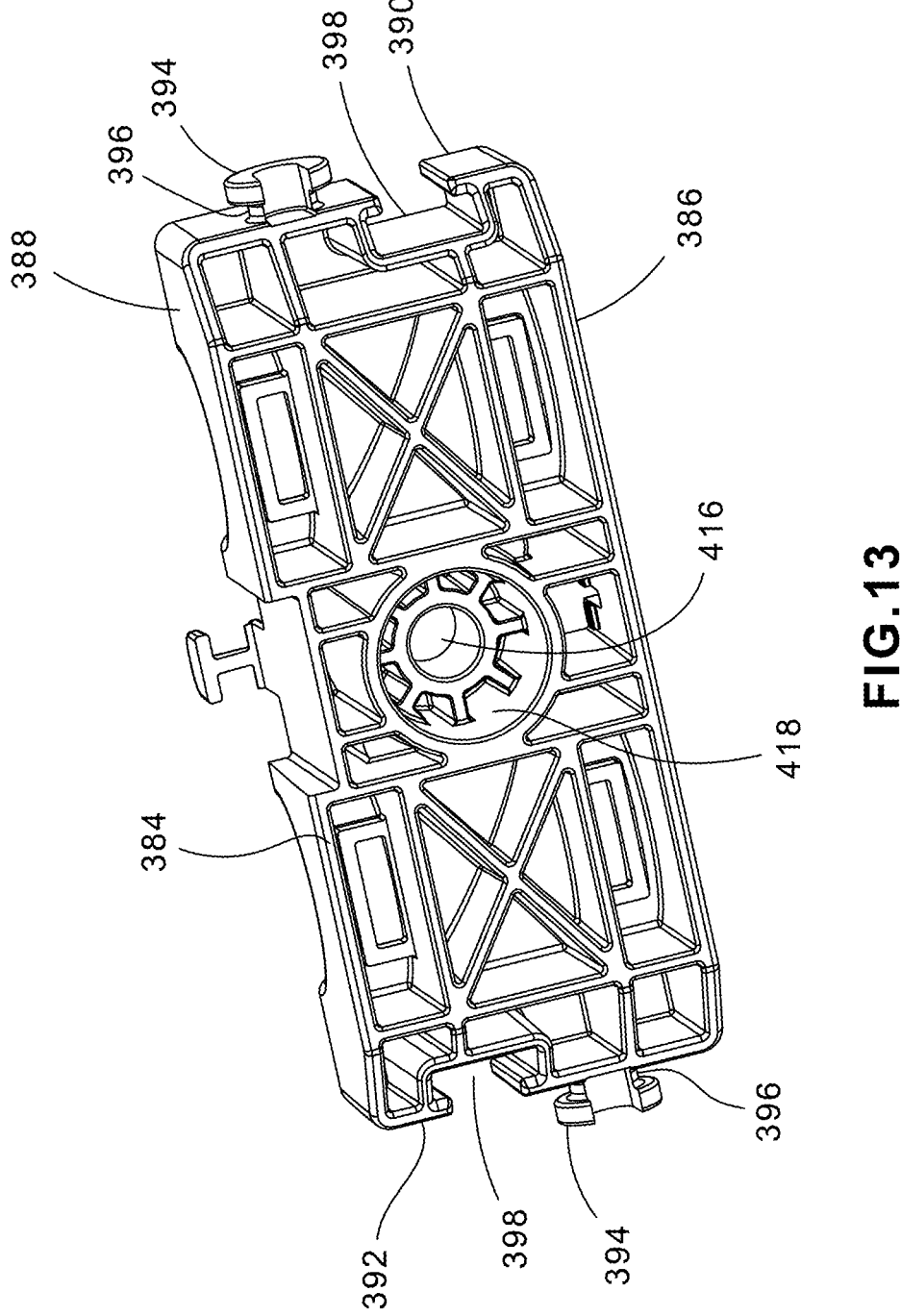
FIG. 13 is a bottom perspective view of the cable clamp half of the cable clamp assembly of FIG. 11.
Figure 14:
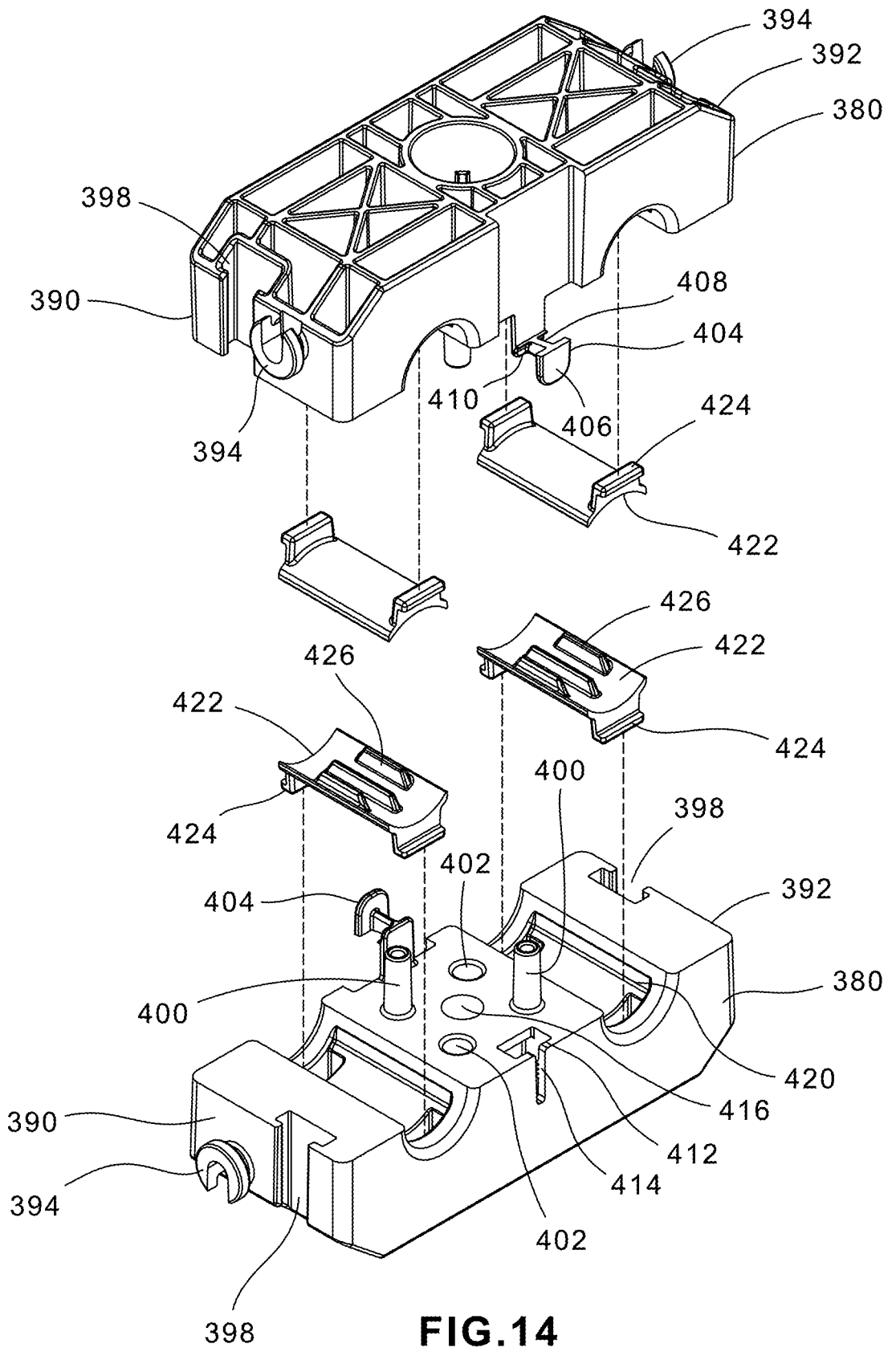
FIG. 14 is an exploded view of the cable clamp assembly of FIG. 11.
Figure 18:
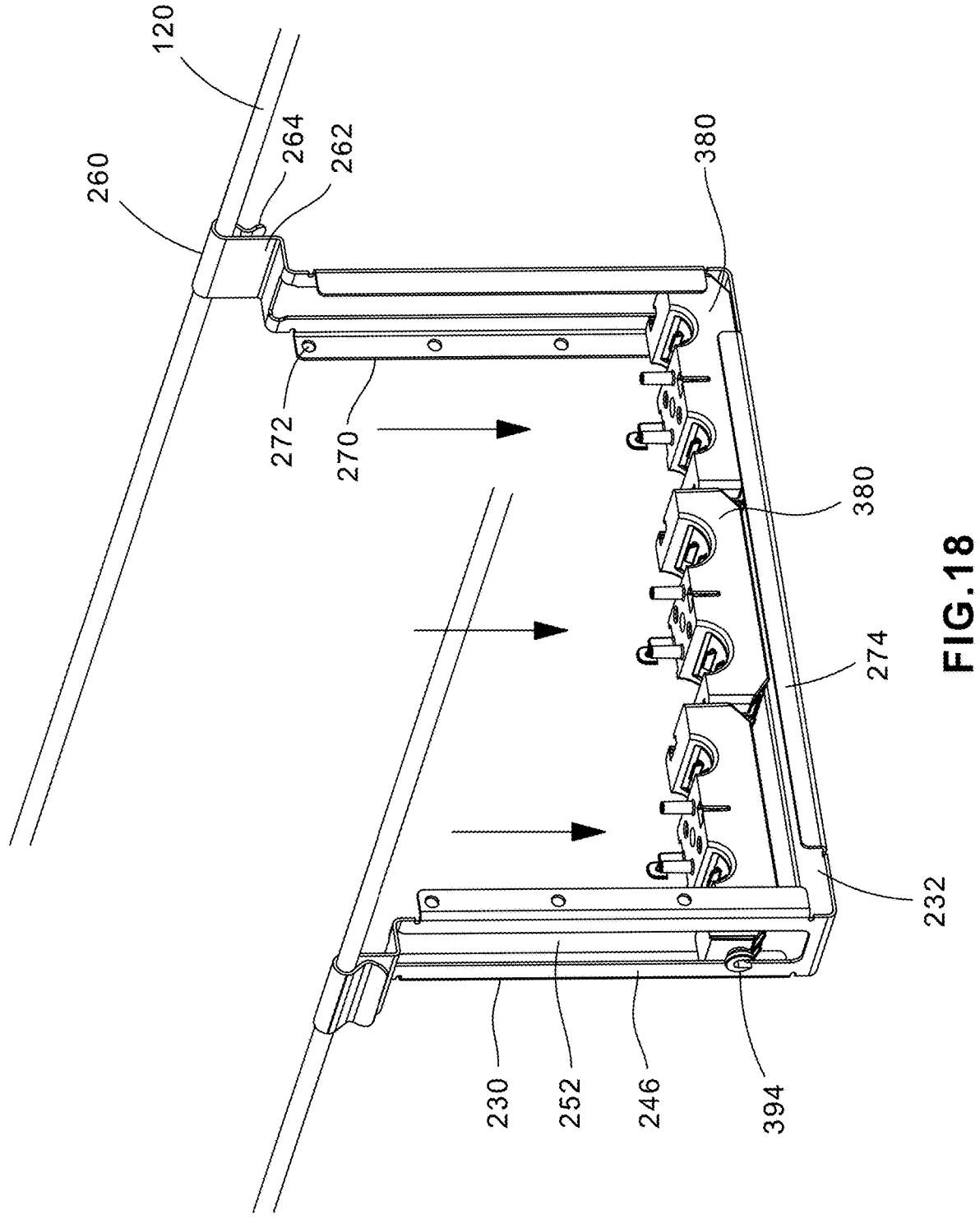
FIG. 18 is a perspective view of the U-shaped bracket positioned on messenger wires of FIG. 17 with bottom cable clamp halves partially installed adjacent each other on the U-shaped bracket.
Figure 19:
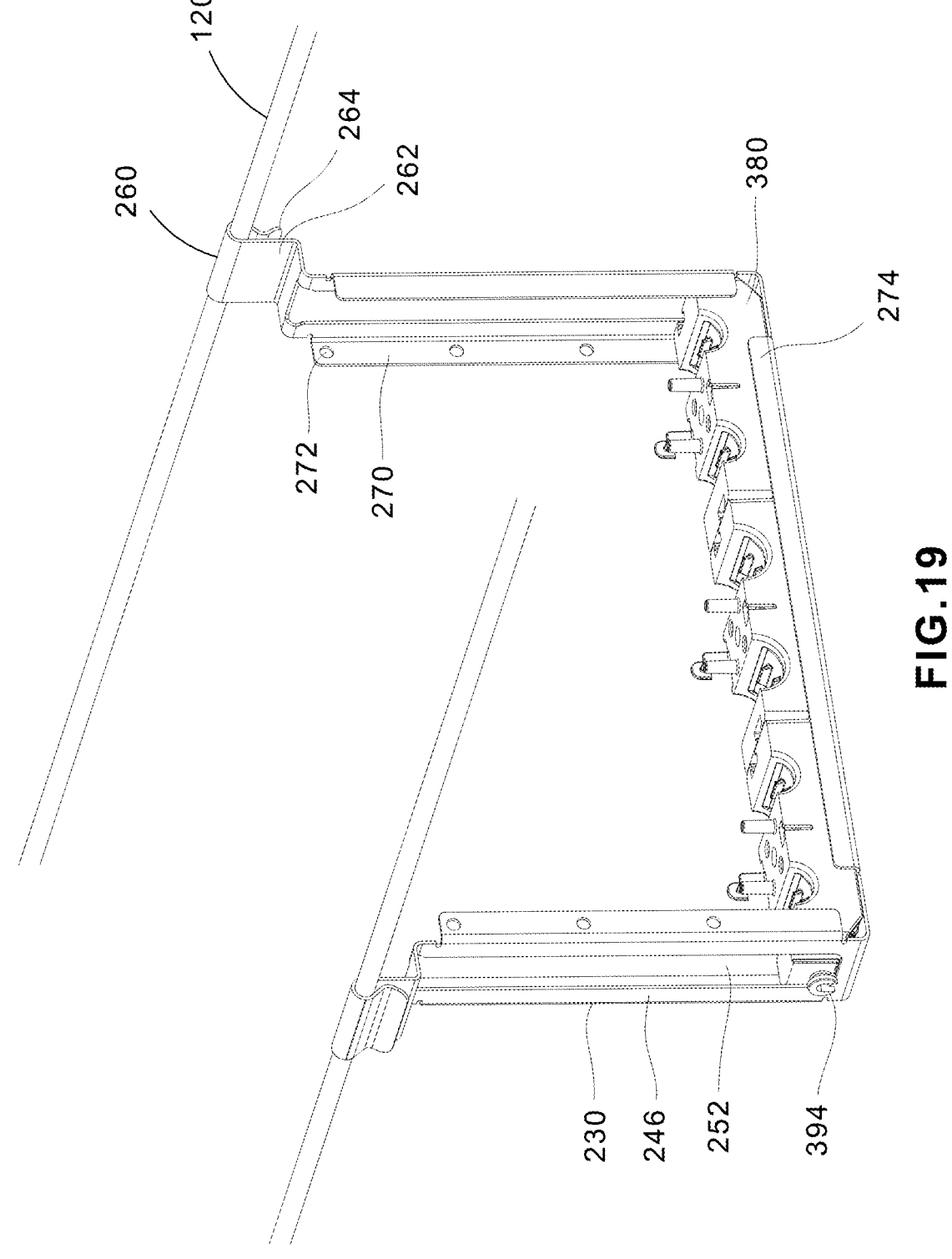
FIG. 19 is a perspective view of the U-shaped bracket positioned on messenger wires of FIG. 18 with bottom cable clamp halves installed adjacent each other on the U-shaped bracket.
Figure 20:
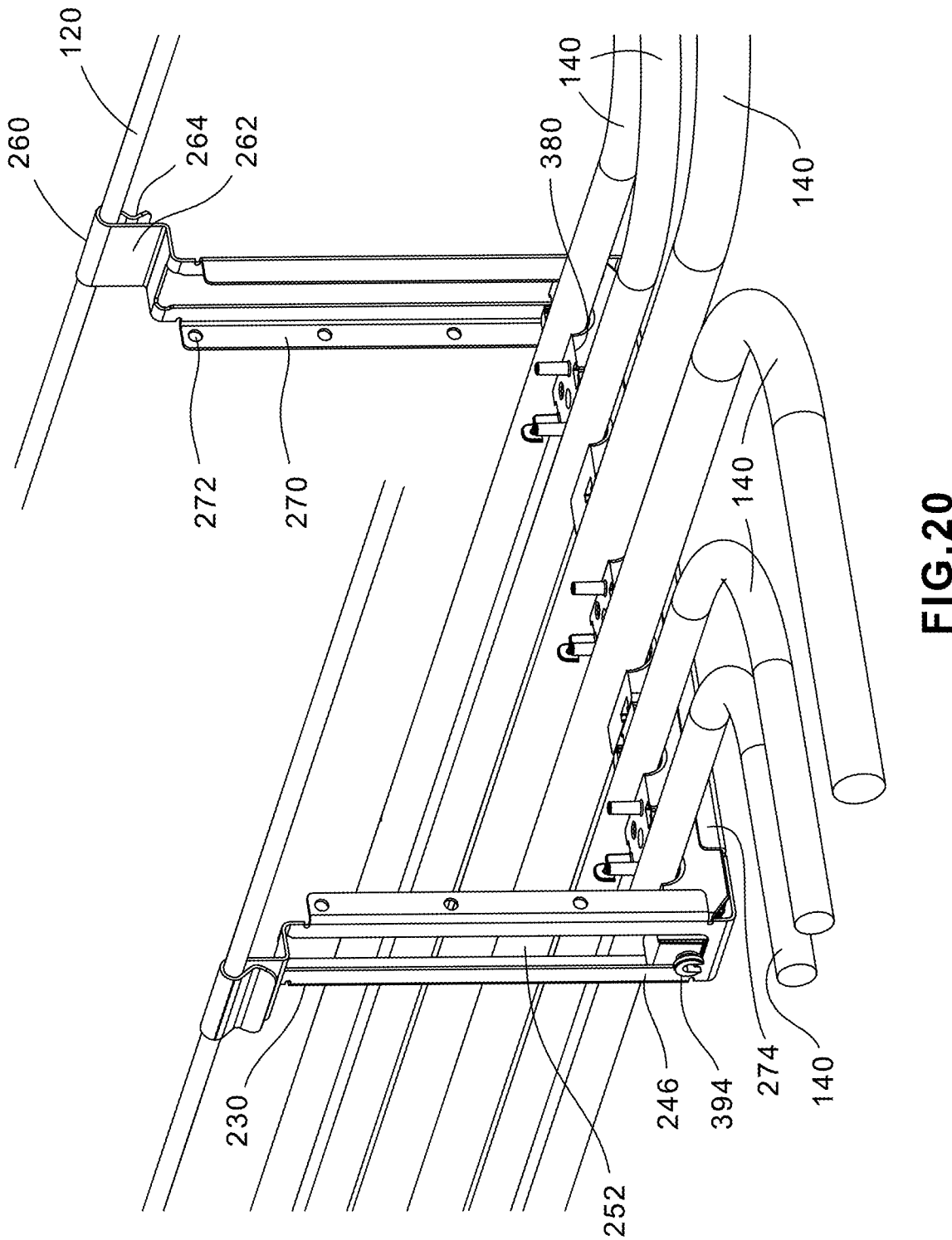
FIG. 20 is a perspective view of the U-shaped bracket positioned on messenger wires with bottom cable clamp halves installed on the U-shaped bracket of FIG. 19 with cables positioned in the bottom cable clamp halves.
Figure 21:
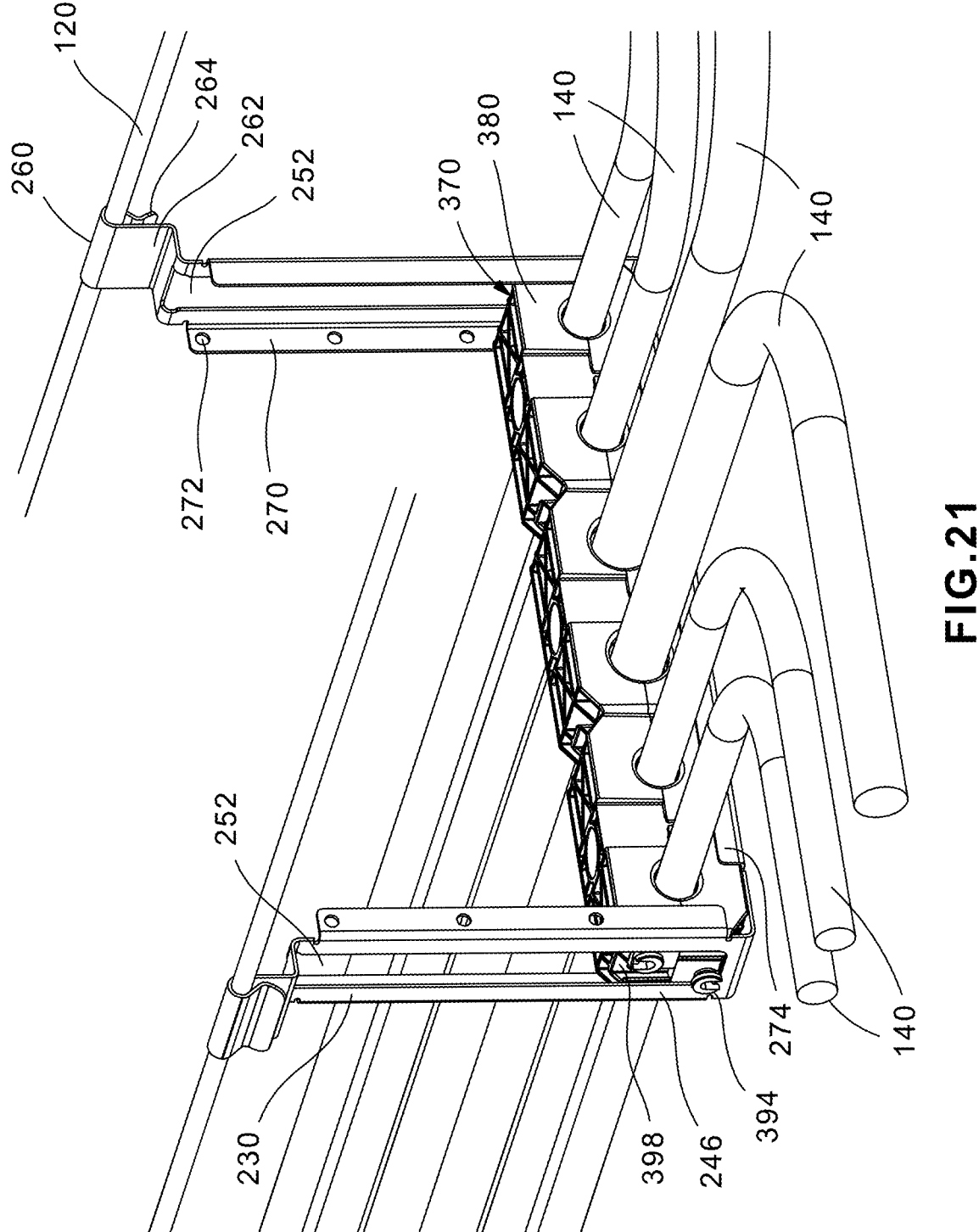
FIG. 21 is a perspective view of the U-shaped bracket positioned on messenger wires with bottom cable clamp halves and cables installed on the U-shaped bracket of FIG. 20 with top cable clamp halves positioned over the cables.
Figure 22:
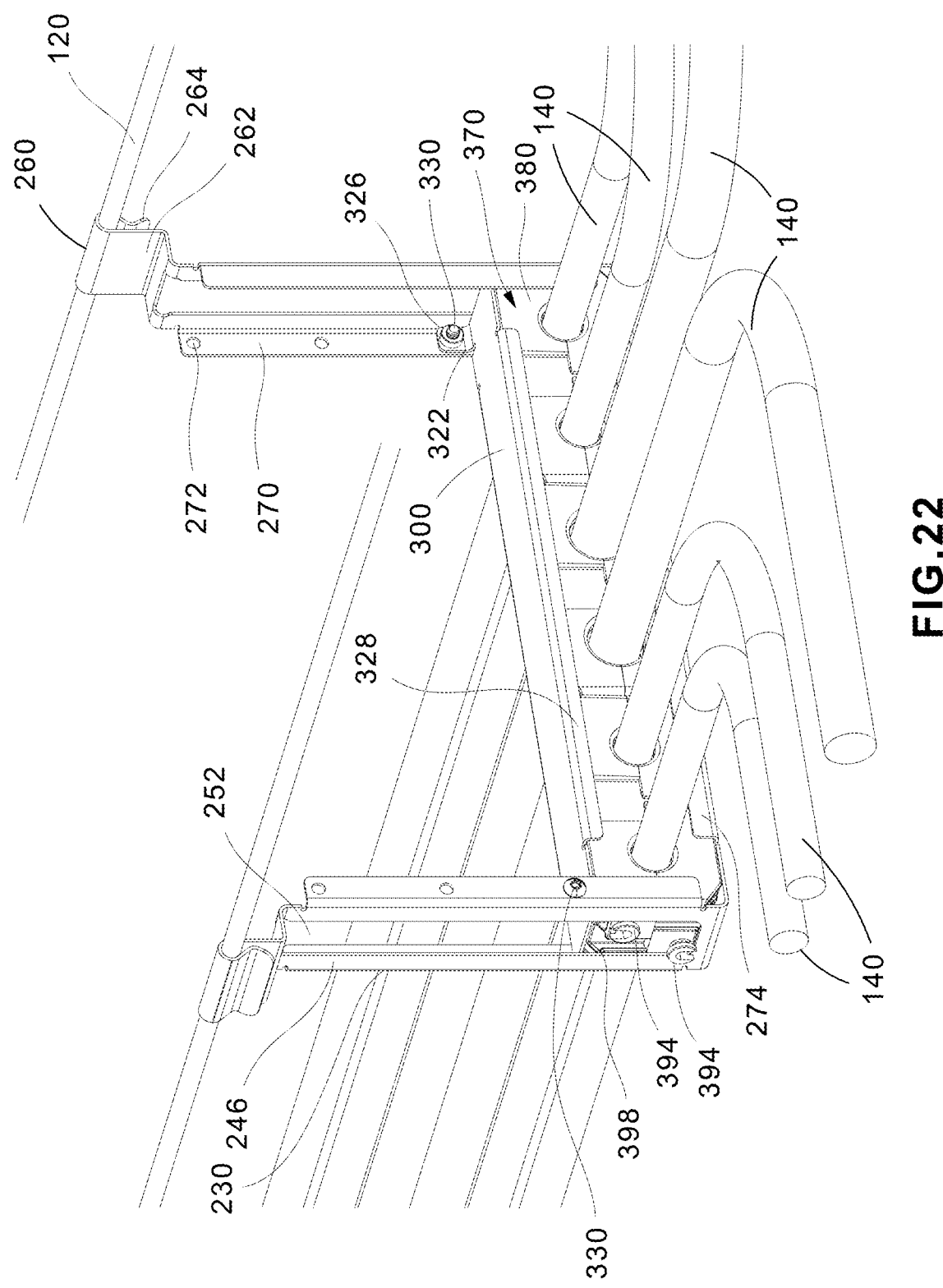
FIG. 22 is a perspective view of the U-shaped bracket positioned on messenger wires with cable clamp assemblies and cables installed on the U-shaped bracket of FIG. 21 with a closure bracket installed on top of the cable clamp assemblies.
Figure 23:
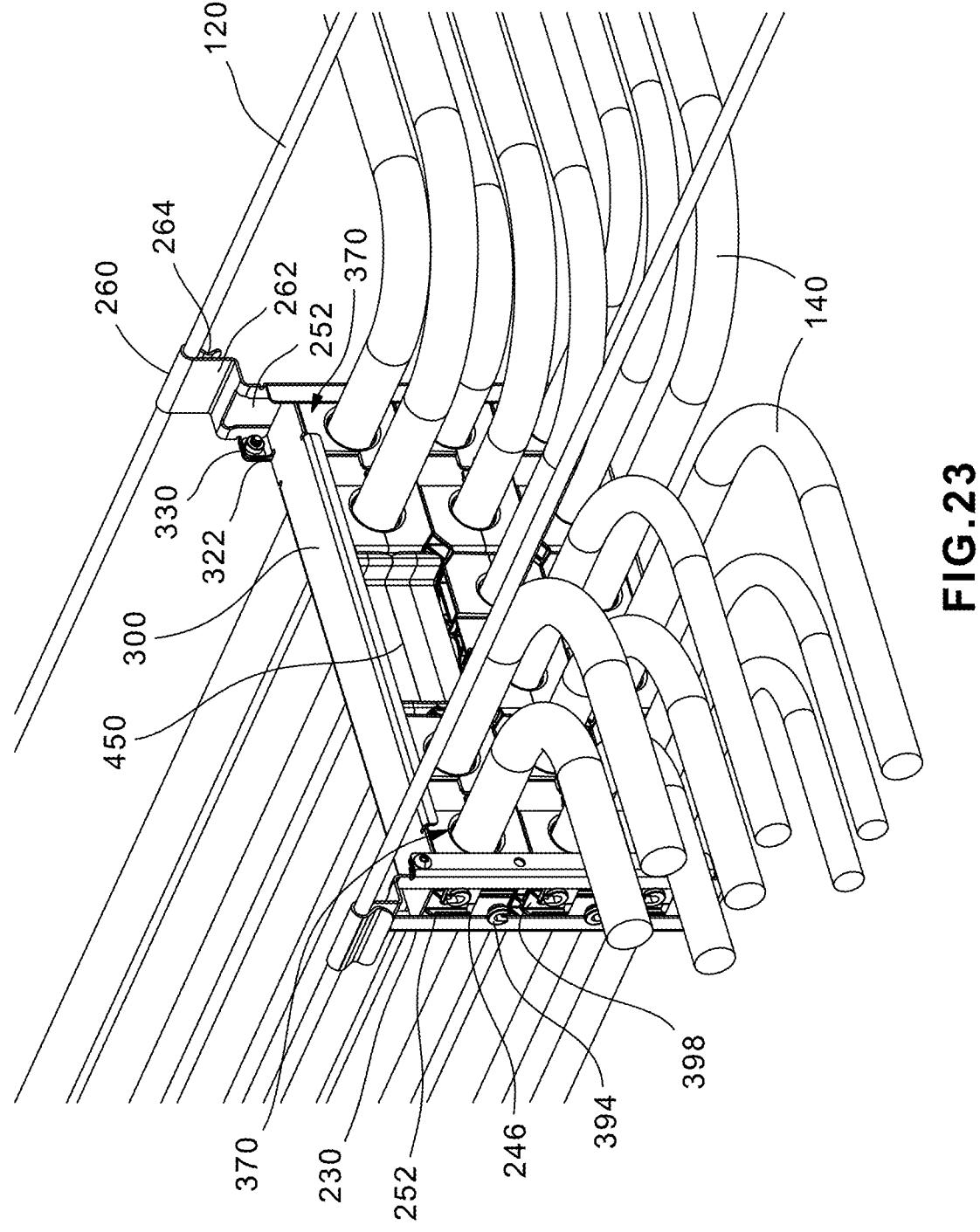
FIG. 23 is a perspective view of the cable management system of FIG. 7 installed on messenger wires and with a plurality of cables routed in the cable clamp assemblies.
Figure 24:
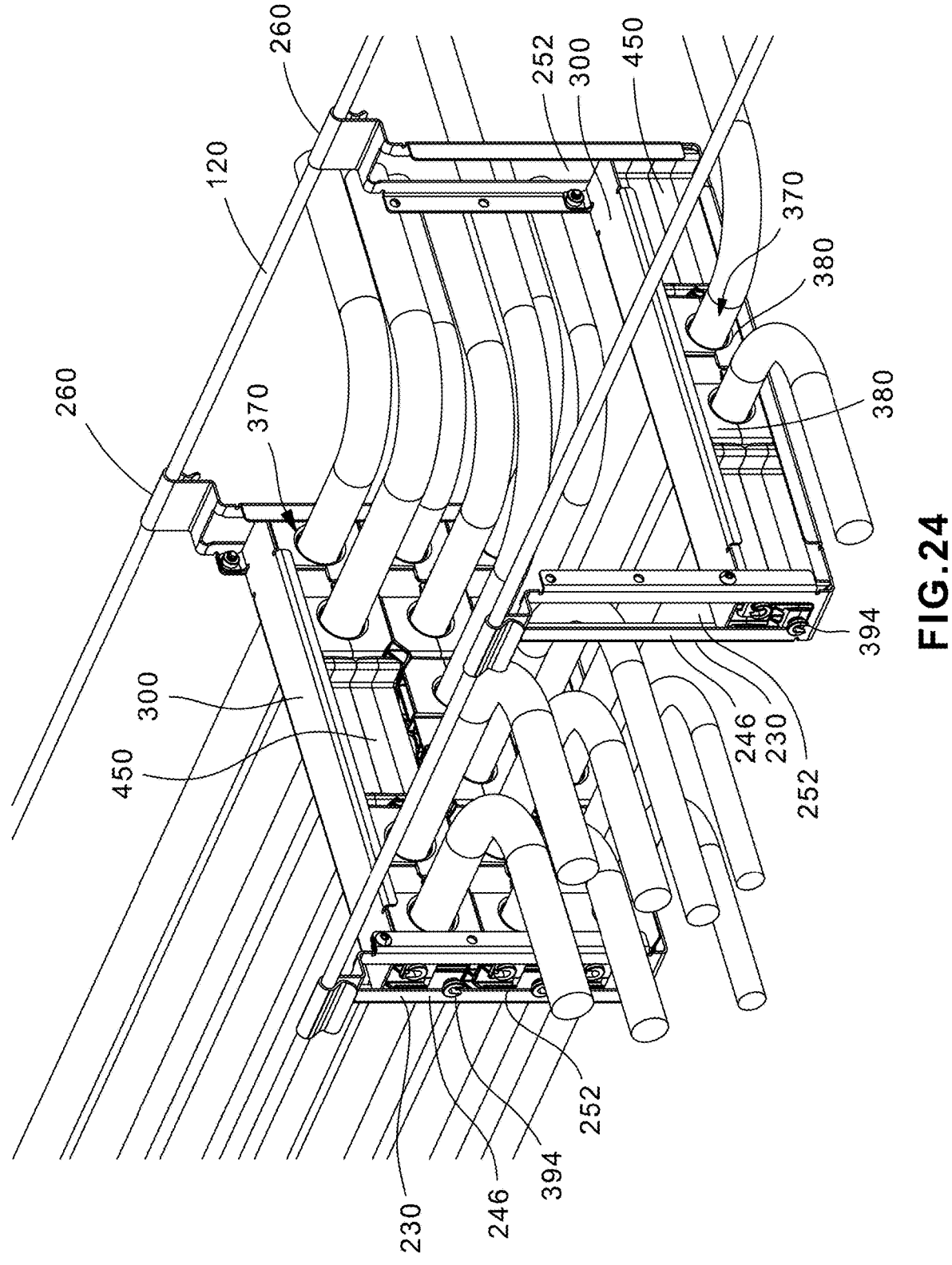
FIG. 24 is a perspective view of the cable management system of FIG. 23 and a second aligned cable management system routing cables.

As illustrated in FIG. 12, each cable clamp half 380 includes a top 382, a bottom 384, a front 386, a back 388, a first side 390, a second side 392, and saddles 420. The first side 390 and the second side 392 of each cable clamp half 380 includes a button pad 394 and a button pad slot 398. The button pad 394 extends from the first side 390 and the second side 392 via a shaft 396. The button pad slot 398 is sized to receive a button pad 394 from an adjacent cable clamp half 380. The button pad slot 398 extends from the top 382 of the cable clamp half 380 to the bottom 384 of the cable clamp half 380. As illustrated in FIG. 18, the button pad slots 398 receive a button pad 394 when cable clamp halves 380 are installed adjacent to each other.

Each cable clamp half 380 includes two alignment bosses 400 or posts and two boss chambers 402 or holes. The alignment bosses 400 are positioned diagonally to each other and the boss chambers 402 are positioned diagonally to each other. As a result, when the cable clamp halves 380 are mounted to each other, the alignment bosses 400 of a bottom cable clamp half are housed in the boss chambers 402 of a top cable clamp half.

Each cable clamp half 380 includes a T-latch 404 on the back 388 of the cable clamp half 380 and a T-latch slot 412 on the front 386 of the cable clamp half 380. The T-latch 404 includes a release tab 406, a latch stem 408, and two latches 410. The T-latch slot 412 includes two sets of teeth 414 for providing adjustability and for enabling range taking. The center of each cable clamp half 380 has a mounting bolt hole 416 and the bottom 384 of each cable clamp half 380 includes a fastener head relief 418.

The saddles 420 of the cable clamp halves 380 receive the cushion inserts 422. As illustrated in FIG. 15, the range taking cushion inserts 422 includes two latches 424. The latches 424 connect the cushion insert 422 to the cable clamp half 380. The cushion inserts 422 also include a plurality of flexible ribs 426 for providing range variance with the cable diameters.

Figure 16A:
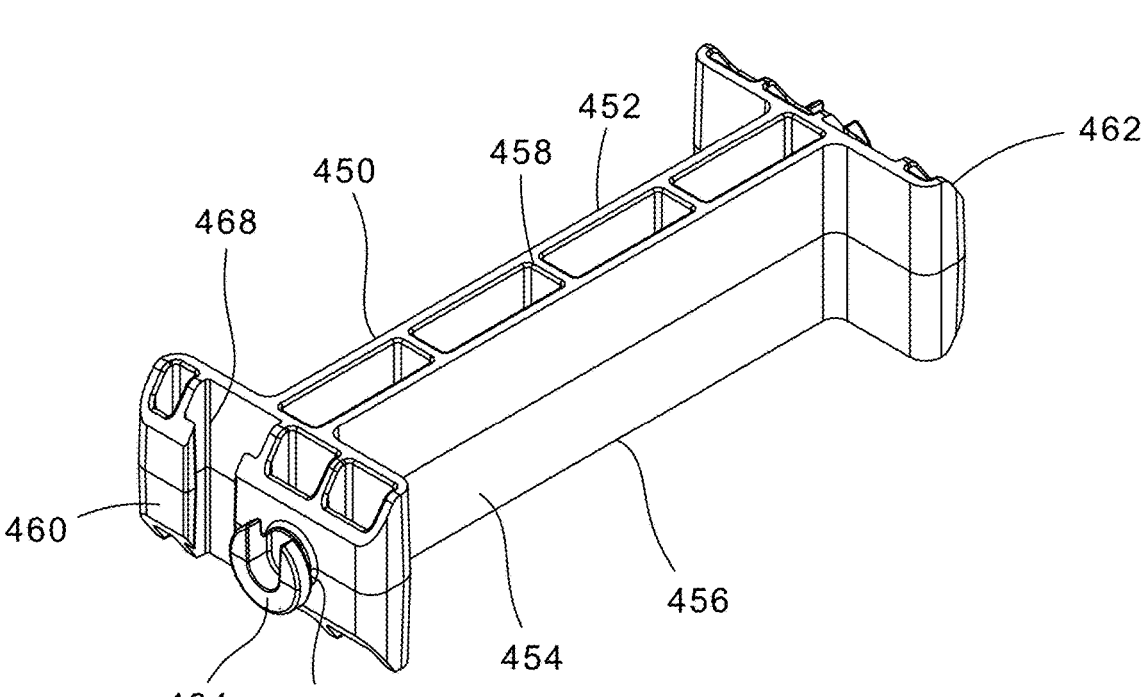
FIG. 16A is a bottom perspective view of the cable spacer installed in the cable management system of FIG. 7.
Figure 16B:
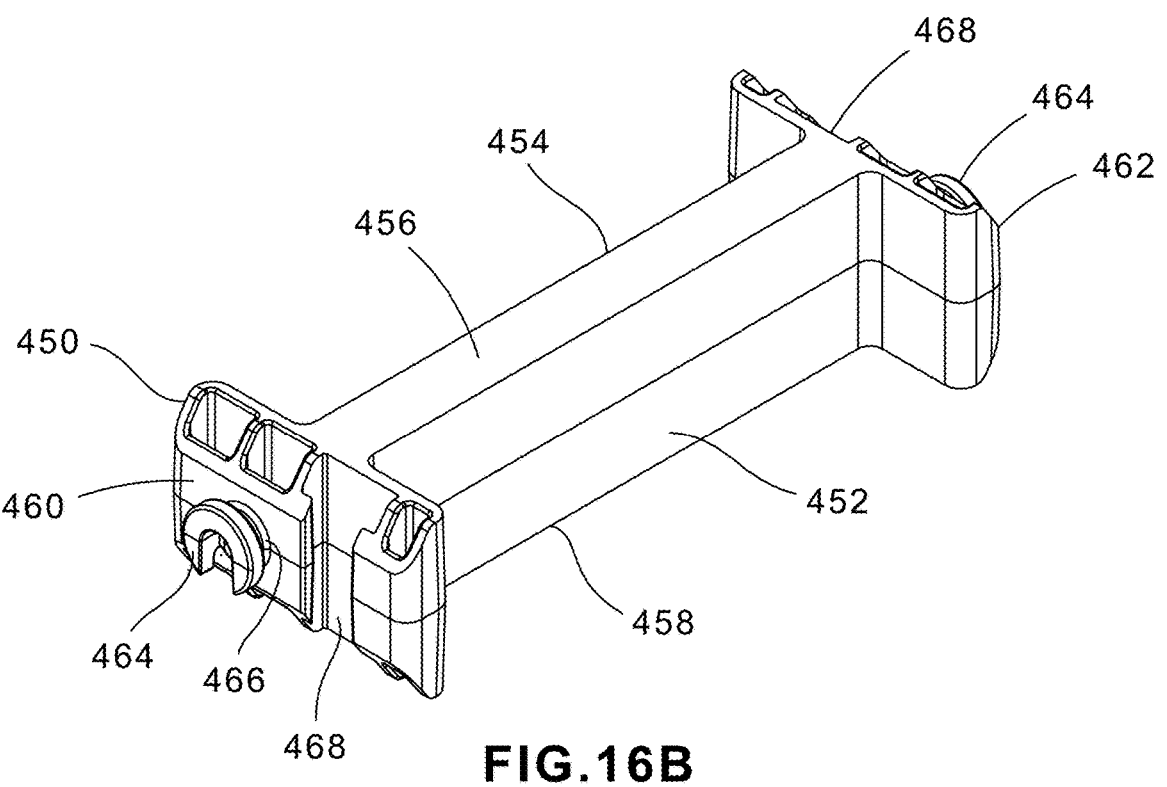
FIG. 16B is a top perspective view of the cable spacer installed in the cable management system of FIG. 7.
Figure 17:
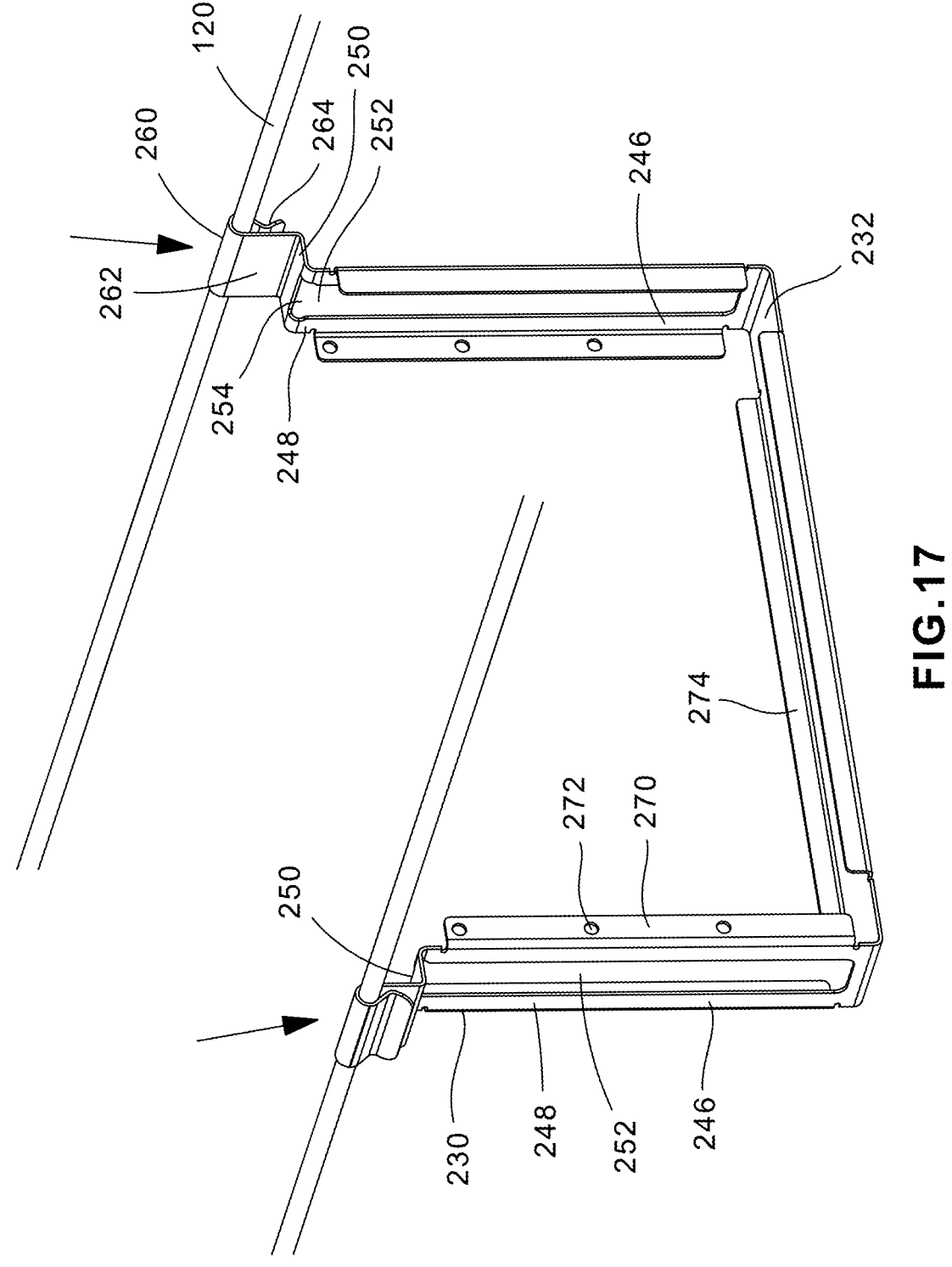
FIG. 17 is a perspective view of the U-shaped bracket of the cable management system of FIG. 7 positioned on messenger wires.

As cables are installed in the cable management system, there may be locations where cables will not be routed. A cable spacer 450 is installed in the U-shaped bracket 230 to block these locations (see FIG. 7). As illustrated in FIGS. 16A-B, the cable spacer 450 includes a front 452, a back 454, a top 456, a bottom 458, a first side 460 and a second side 462. The first side 460 and second side 462 include a button pad 464 extending from each side via shaft 466 and a button pad slot 468 extending from the top 456 to the bottom 458 of the cable spacer 450. The button pads 464 and button pad slots 468 mate with the button pads 464 and the button pads slots 468 of adjacent cable clamp halves 380 in the cable management system 370.

FIGS. 17-24 illustrate the installation of the cable management system. The installation begins by hanging the U-shaped bracket 230 on the messenger wires 120 via the messenger wire latches 260 on each side of the U-shaped bracket 230. The first row of bottom cable clamp halves 380 or cable spacers 450 is inserted into the U-shaped bracket 230. The button pads 394 extending from the sides of the cable clamp halves 380 are slid in the slots 252 in the arms 246 of the U-shaped bracket 230. The adjacent bottom cable clamp halves 380 are connected to each other using the button pads 394 and button pad slots 398. Once the first row of cable clamp halves 380 have been installed, the first row of cables 140 are loaded on the cushion inserts 422 of the cable clamp halves 380. The top cable clamp halves 380 are then installed in the U-shaped bracket 230 over the cables 140. Adjacent top cable clamp halves 380 are connected to each other using the button pads 394 and button pad slots 398. The top cable clamp halves are secured to the bottom cable clamp halves via the T-latch 404 and T-latch slot 412. The closure bracket 300 can be installed on the cable clamp assemblies when the U-shaped bracket 230 is ⅓ full, ⅔ full, or filled. If the number of cables to be installed is less than the number of available cable clamp openings, a cable spacer 450 will be used to fill the row. As discussed above, the cable spacer 450 is connected to adjacent cable clamp halves 380 by the button pads 464, 394 and the button pad slots 468, 398, respectively. Alternatively, the cable clamp halves 380 may be left empty. The installation process continues until all cables in the system have been routed, as desired.

The cable management system of FIGS. 7-24 provides for cable diameter compensation with range taking cushion inserts and variable cable gauges in the same row and throughout the cable clamp array. Each cable clamp half routes one circuit of two cables for AC or DC power.

The cable clamp halves are easily slid in the U-shaped bracket and secured to each other. No special tool is required. The alignment bosses provide for easy mating of the cable clamp halves and the adjusting teeth enable cable placement in the cable clamp halves. The robust design of the cable management system withstands severe weather and accidental damage.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A cable management system for supporting cables in solar applications, the cable management system comprising:

7 a U-shaped bracket comprising:

a base comprising a first arm and a second arm, wherein the first arm comprises a first slot extending a first length of the first arm, and wherein the second arm comprises a second slot extending a second length of the second arm; and a plurality of cable clamp assemblies positioned within the U-shaped bracket, wherein each cable clamp assembly of the plurality of cable clamp assemblies comprises:

a first cable clamp half comprising a first top, a first bottom, a first front, a first back, a first side, a first button pad extending from the first side, and a first button pad slot disposed within the first side; and a second cable clamp half comprising a second top, a second bottom, a second front, a second back, a second side, a second button pad extending from the second side, and a second button pad slot disposed within the second side, wherein the first button pad slot is configured to receive the second button pad, and wherein the second button pad slot is configured to receive the first button pad.

2. The cable management system of claim 1, wherein the first cable clamp half and the second cable clamp half are configured to separate one or more cables positioned within the U-shaped bracket.

3. The cable management system of claim 1, wherein the first front of the first cable clamp half comprises a first T-latch slot and the first back of the first cable clamp half comprises a first T-latch, and wherein the second front of the second cable clamp half comprises a second T-latch slot and the second back of the second cable clamp half comprises a second T-latch.

4. The cable management system of claim 1, wherein the first cable clamp half and the second cable clamp half respectively comprise a plurality of saddles configured to hold one or more cables.

5. The cable management system of claim 4, wherein each saddle of the plurality of saddles compression insert, wherein the compression insert comprises one or more ribs configured to couple to the one or more cables, and wherein the one or more cables comprise one or more different diameters.

6. The cable management system of claim 1, wherein the second cable clamp half comprises:

a third side; and a third button pad extending from the third side, wherein the third button pad is configured to couple to the second slot of the second arm, and wherein the third button pad is positioned adjacent an outer surface of the second arm.

7. The cable management system of claim 1, wherein the U-shaped bracket comprising a messenger wire latch configured to couple to a messenger wire, wherein the messenger wire latch comprises a vertical member and a spring hook.

8. The cable management system of claim 7, wherein the messenger wire latch is configured to deflect to couple to messenger wires of various diameters.

9. The cable management system of claim 1, wherein the first slot and the second slot respectively comprise an entrance end and a bottom.

10. The cable management system of claim 9, wherein the first arm and the second arm respectively comprise a vertical member and a horizontal member.

11. The cable management system of claim 10, wherein the first slot or the second slot comprises the entrance end in the horizontal member, the entrance end is configured to support a load of the first cable clamp half and the second cable clamp half.

12. The cable management system of claim 10, wherein the first slot extends down a center of the vertical member of the first arm, and wherein the second slot extends down a center of the vertical member of the second arm.

13. The cable management system of claim 10, wherein the first slot extends from the entrance end in the horizontal member of the first arm to the bottom in the vertical member of the first arm.

14. The cable management system of claim 1, wherein the U-shaped bracket comprises:

a first gusset extending from the first arm and the base; and a second gusset extending from the second arm and the base.

15. The cable management system of claim 1, comprising a closure bracket positioned adjacent to the plurality of cable clamp assemblies.

16. The cable management system of claim 15, wherein the closure bracket comprises a plurality of flanges extending in a first direction and at least one first gusset extending in a second direction, wherein the second direction is opposite the first direction.

17. The cable management system of claim 16, wherein the U-shaped bracket comprises a plurality of second gussets extending from the first arm, the second arm, or and the base, and wherein the flanges of the closure bracket are configured to couple to the plurality of second gussets.

18. The cable management system of claim 1, comprising a cable spacer positioned between the first cable clamp half of the plurality of cable clamp assemblies and the second cable clamp half of the plurality of cable clamp assemblies.

19. The cable management system of claim 18, wherein the cable spacer comprises a top, a bottom, a front, a back, and a side, wherein the side comprises a button pad and a button pad slot, and wherein the button pad of the cable spacer is configured to be received by the first button pad slot or the second button pad slot.

20. The cable management system of claim 1, wherein the plurality of cable clamp assemblies comprises a third cable clamp half comprising a third top, a third bottom, a third front, a third back, a third side, and a third button pad extending from the third side, wherein the third cable clamp half is stacked on top of the first cable clamp half.

* * * * *